US012769223B2

(12) United States Patent
Tokiwa et al.

(10) Patent No.: US 12,769,223 B2
(45) Date of Patent: Oct. 20, 2026

(54) IMAGE FORMING APPARATUS

(71) Applicant: CANON KABUSHIKI KAISHA, Tokyo (JP)

(72) Inventors: Shuhei Tokiwa, Tokyo (JP); Yuichi Kikuchi, Shizuoka (JP); Masahiro Kurachi, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/203,463

(22) Filed: May 9, 2025

(65) Prior Publication Data

US 2025/0348015 A1 Nov. 13, 2025

(30) Foreign Application Priority Data

May 12, 2024 (JP) ................................ 2024-077637

(51) Int. Cl.

*G03G 21/16* (2006.01)
*G03G 15/02* (2006.01)
*G03G 21/18* (2006.01)

(52) U.S. Cl.

CPC ..... *G03G 15/0225* (2013.01); *G03G 21/1814* (2013.01)

(58) Field of Classification Search

CPC ....................... G03G 15/0225; G03G 21/1814
USPC ................................ 399/111, 168, 174, 176
See application file for complete search history.

(56) References Cited

U.S. PATENT DOCUMENTS

| | | | |
|---|---|---|---|
| 11,644,762 | B2 | 5/2023 | Kinuta et al. |
| 11,809,126 | B2 | 11/2023 | Kinuta et al. |
| 11,860,566 | B2 | 1/2024 | Kanazawa et al. |
| 12,204,269 | B2 | 1/2025 | Motohashi et al. |
| 12,393,135 | B2 | 8/2025 | Shirahata et al. |

FOREIGN PATENT DOCUMENTS

| | | | | | |
|---|---|---|---|---|---|
| CN | 102467008 | A | * | 5/2012 | ......... G03G 15/0225 |
| JP | 2011-145419 | A | | 7/2011 | |
| JP | 2020-122871 | A | | 8/2020 | |
| JP | 2023-029102 | A | | 3/2023 | |
| JP | 2023-029103 | A | | 3/2023 | |

* cited by examiner

*Primary Examiner* — Hoan H Tran
(74) *Attorney, Agent, or Firm* — Venable LLP

(57) ABSTRACT

When a time from when a point of the surface of the charging member contacts the cleaning member until the point subsequently contacts the cleaning member again by a rotation of the charging member is defined as a rotation time A [sec], and a time constant τ of the charging member is a value represented by $\tau=\frac{1}{2}\pi fp$ [sec], wherein fp is a frequency at which an absolute value of an imaginary part obtained by impedance measurement of the charging member shows a maximum value, and the time constant τ is defined as an index indicating that an electric charge of the surface of the charging member is attenuated, the rotation time A and the time constant τ satisfy the following relationship: $A/\tau \geq 60$, wherein the time constant τ is $1.0\times10^{-5}$ [sec] or more and $1.2\times10^{-3}$ [sec] or less.

11 Claims, 14 Drawing Sheets

| | EMB. 1 | EMB. 2 | EMB. 3 | EMB. 4 | EMB. 5 | COMP. EX. 1 | COMP. EX. 2 | COMP. EX. 3 | COMP. EX. 4 |
|---|---|---|---|---|---|---|---|---|---|
| CHARGING ROLLER | (1) | (2) | (2) | (2) | (2) | (3) | (4) | (5) | (4) |
| UNVULCANIZED DOMAIN COMPOSITION | (1) | (2) | (2) | (2) | (2) | — | — | — | — |
| UNVULCANIZED RUBBER COMPOSITION | (1) | (2) | (2) | (2) | (2) | (3) | (4) | (4) | (4) |
| ELASTIC LAYER MOLDING RUBBER COMPOSITION | (1) | (2) | (2) | (2) | (2) | (3) | (4) | (4) | (4) |
| SURFACE LAYER COATING LIQUID | (1) | (2) | (2) | (2) | (2) | — | (2) | (3) | (2) |
| NOTES | — | — | HELICAL ROLLER | HELICAL ROLLER CONTACT POSITION CHANGE | HELICAL ROLLER CONTACT POSITION CHANGE | — | — | — | GEAR |

Fig. 16

| | | | EMB. 1 | COMP. EX. 1 | COMP. EX. 2 | COMP. EX. 3 | COMP. EX. 4 | EMB. 2 | EMB. 3 | EMB. 4 | EMB. 5 |
|---|---|---|---|---|---|---|---|---|---|---|---|
| | | CHARGING ROLLER | (1) | (3) | (4) | (5) | (4) | (2) | (2) | (2) | (2) |
| STRUCTURE | | CLEANING ROLLER SHAPE | ROLL | ROLL | ROLL | ROLL | ROLL | ROLL | HELICAL | HELICAL | HELICAL |
| | | CLEANING ROLLER CONTACT POSITION $\theta$ [°] | 0 | 0 | 0 | 0 | 0 | 0 | 0 | 20 | 20 |
| | | CLEANING ROLLER/ CHARGING ROLLER SHAFT SUPPORTING STRUCTURE | FIXED | FIXED | FIXED | FIXED | FIXED | FIXED | FIXED | FIXED | SPRING URGING |
| REQT (1) | | TIME CONSTANT $\tau$ | 1.20E-03 | 1.00E-02 | 1.60E-03 | 9.00E-06 | 1.60E-03 | 1.00E-04 | 1.00E-04 | 1.00E-04 | 1.00E-04 |
| | | YES/NO | YES | NO | NO | NO | NO | YES | YES | YES | YES |
| REQT (2) | IMG 1 | RTTN TIME A[sec] | 0.116 | 0.116 | 0.116 | 0.116 | 0.16 | 0.116 | 0.232 | 0.232 | 0.232 |
| | | A/ $\tau$ | 9.67E+01 | 1.16E+01 | 7.25E+01 | 1.29E+04 | 1.00E+02 | 1.16E+03 | 2.32E+03 | 2.32E+03 | 2.32E+03 |
| | | YES/NO | YES | NO | YES | YES | YES | YES | YES | YES | YES |
| | IMG 2 | RTTN TIME A[sec] | 7.21E-02 | 7.21E-02 | 7.21E-02 | 7.21E-02 | 9.95E-02 | 7.21E-02 | 1.44E-01 | 1.44E-01 | 1.44E-01 |
| | | A/ $\tau$ | 6.01E+01 | 7.21E+00 | 4.51E+01 | 8.01E+03 | 6.22E+01 | 7.21E+02 | 1.44E+03 | 1.44E+03 | 1.44E+03 |
| | | YES/NO | YES | NO | NO | YES | YES | YES | YES | YES | YES |
| EVLTN RSLT | | IMAGE 1 | A | C | B | BLACK STRIPE:X | DNSTY N-UNFM:X | A | A | A | A |
| | | IMAGE 2 | B | D | C | — | — | A | A | A | A |
| | | IMAGE 3 | — | — | — | — | — | D | C | B | A |

Fig. 17

IMAGE FORMING APPARATUS

FIELD OF THE INVENTION AND RELATED ART

The present invention relates to an image forming apparatus, such as a printer, a copying machine, and a facsimile machine, using an electrophotographic type.

Conventionally, as the image forming apparatus using the electrophotographic type, there is an image forming apparatus employing a process cartridge type in which a photosensitive member and process means actable on the photosensitive member are integrally into a cartridge and in which the cartridge is made detachably mountable to an apparatus main assembly. As the process means actable on the photosensitive member, there are a charging member for electrically charging the photosensitive member, a cleaning member for removing toner remaining on the photosensitive member, a developing unit for developing an electrostatic latent image, formed on the photosensitive member, with the toner, and the like means. These process means is integrally assembled together with the photosensitive member into a single cartridge (process cartridge), thus being made capable of being exchanged at the same time by a user, so that usability is improved.

Further, there is a cartridge employing a contact charging type in which the charging member charges the photosensitive member in contact with the photosensitive member. In many cases, a photosensitive drum is used as the photosensitive member, and a charging roller is used as the charging member. In the case of the cartridge employing the contact charging type, with life time extension of the cartridge, there is a possibility that toner and fine particles (hereinafter, referred to as an "external additive") added to a surface of the toner are accumulated on a surface of the charging roller. Thus, in the case where during use of the cartridge, the charging roller is contaminated by accumulation of the toner and the external additive, improper charging is caused, and for example, is visualized as density non-uniformity of a half-tone image in some instances. This improper charging is a problem occurring in a latter half of a life time of the cartridge in general, and becomes conspicuous with a longer life time of the cartridge.

Therefore, a constitution in which the cleaning member is provided so as to contact the charging roller and thus the toner and the external additive which are deposited on the surface of the charging roller (hereinafter, the toner and the external additive are also referred to as a "deposited matter") are removed is used in some instances.

In Japanese Laid-open Patent Application (JP-A) No. 2011-145419 discloses a constitution in which a cleaning roller is contacted to a charging roller and in which the cleaning roller includes a contact portion contacting the charging roller and a non-contact portion non-contacting the charging roller. In addition, in the constitution disclosed in JP-A No. 2011-145419, before image formation or after the image formation, a voltage having a characteristic such that charging of the surface of the charging roller due to friction with the cleaning roller is cancelled is applied to the charging roller. This is for taking countermeasure against the following problem. That is, in the contact portion, the charging roller is charged by the friction between the cleaning roller and the charging roller, and on the other hand, in the non-contact portion, the charging of the charging roller does not occur and thus a potential difference occurs on the charging roller, so that density non-uniformity occurs an image due to the potential difference between the contact portion and the non-contact portion. The voltage application to the charging roller is for taking the countermeasure against this problem.

Both of the cleaning roller and the charging roller are formed of resin at surfaces (outer peripheral surfaces, outer surfaces) thereof in many cases, and triboelectric charge generated by friction therebetween becomes a problem in some cases.

By the triboelectric charge, the charging roller and the cleaning roller have electric charges of polarities opposite to each other. By this, an absolute value of a surface potential of the charging roller lowers and electric discharge from the charging roller to the photosensitive drum fluctuates, so that a "charging lateral stripe image" is generated in some instances. The charging lateral stripe image is stripe-shaped density non-uniformity which occurs due to electric discharge non-uniformity from the charging roller to the photosensitive drum and which extends in a direction crossing (typically, substantially perpendicular to) a movement direction of a surface of the photosensitive drum.

The electric discharge from the charging roller generates in a minute gap in the neighborhood of a portion where the charging roller and the photosensitive drum are in contact with each other. Ordinarily, the electric discharge is completed in the minute gap on an upstream side of the contact portion between the charging roller and the photosensitive drum. However, as described above, in the case where the absolute value of the surface potential of the charging roller lowers due to the triboelectric charge of the cleaning roller, only by the electric discharge on the upstream side of the contact portion between the charging roller and the photosensitive drum, the electric discharge is not completed, so that unstable electric discharge intermittently generates in a downstream-side minute gap in some instances. An image generated by this intermittent electric discharge is the "charging lateral stripe image". When a life time of the process cartridge or the image forming apparatus is prolonged, a time in which the charging roller rotates in contact with the cleaning roller is long, and therefore, the charging lateral stripe image occurs more conspicuously in some instances.

In the constitution disclosed in JP-A No. 2011-145419, before the image formation or after the image formation, there is a need to, to the charging roller, a voltage of a polarity opposite to a polarity of a voltage during the image formation. For this reason, during continuous printing, it is different to perform an electric charge cancelling operation.

Further, the constitution disclosed in JP-A No. 2011-145419 is for a countermeasure against a problem during initial drive in the case where the charging roller includes the contact portion and a non-contact portion. For that reason, an image defect due to a potential charge due to the triboelectric charge of the charging roller during continuous drive for a long time cannot be suppressed.

SUMMARY OF THE INVENTION

Therefore, a principal object of the present invention is to suppress an occurrence of inconveniences due to triboelectric charge between a cleaning member and a charging member.

The object has been accomplished by an image forming apparatus according to the present invention.

According to an aspect of the present invention, there is provided an image forming apparatus comprising: a rotatable photosensitive member; a charging member configured to electrically charge a surface of the photosensitive member while rotating in a predetermined direction in contact with the surface of the photosensitive member; and a cleaning member configured to clean a surface of the charging member in contact with the charging member, wherein when the surface of the photosensitive member is charged by the charging member, in a case where a time from when a point of the surface of the charging member contacts the cleaning member until the point subsequently contacts the cleaning member again by a rotation of the charging member is defined as a rotation time A [sec], and a time constant τ of the charging member is a value represented by $\tau = \frac{1}{2} \times fp$ [sec], wherein fp is a frequency at which an absolute value of an imaginary part obtained by impedance measurement of the charging member shows a maximum value, and the time constant τ is defined as an index indicating that an electric charge of the surface of the charging member is attenuated, the rotation time A and the time constant τ satisfy the following relationship: $A/\tau \geq 60$, wherein the time constant τ is $1.0 \times 10^{-5}$ [sec] or more and $1.2 \times 10^{-3}$ [sec] or less.

Further features of the present invention will become apparent from the following description of exemplary embodiments with reference to the attached drawings.

BRIEF DESCRIPTION OF THE DRAWINGS

FIG. 16 is a stable showing constitutions of embodiments and comparison examples.

FIG. 17 is a table showing an evaluation result.

Figure 18:
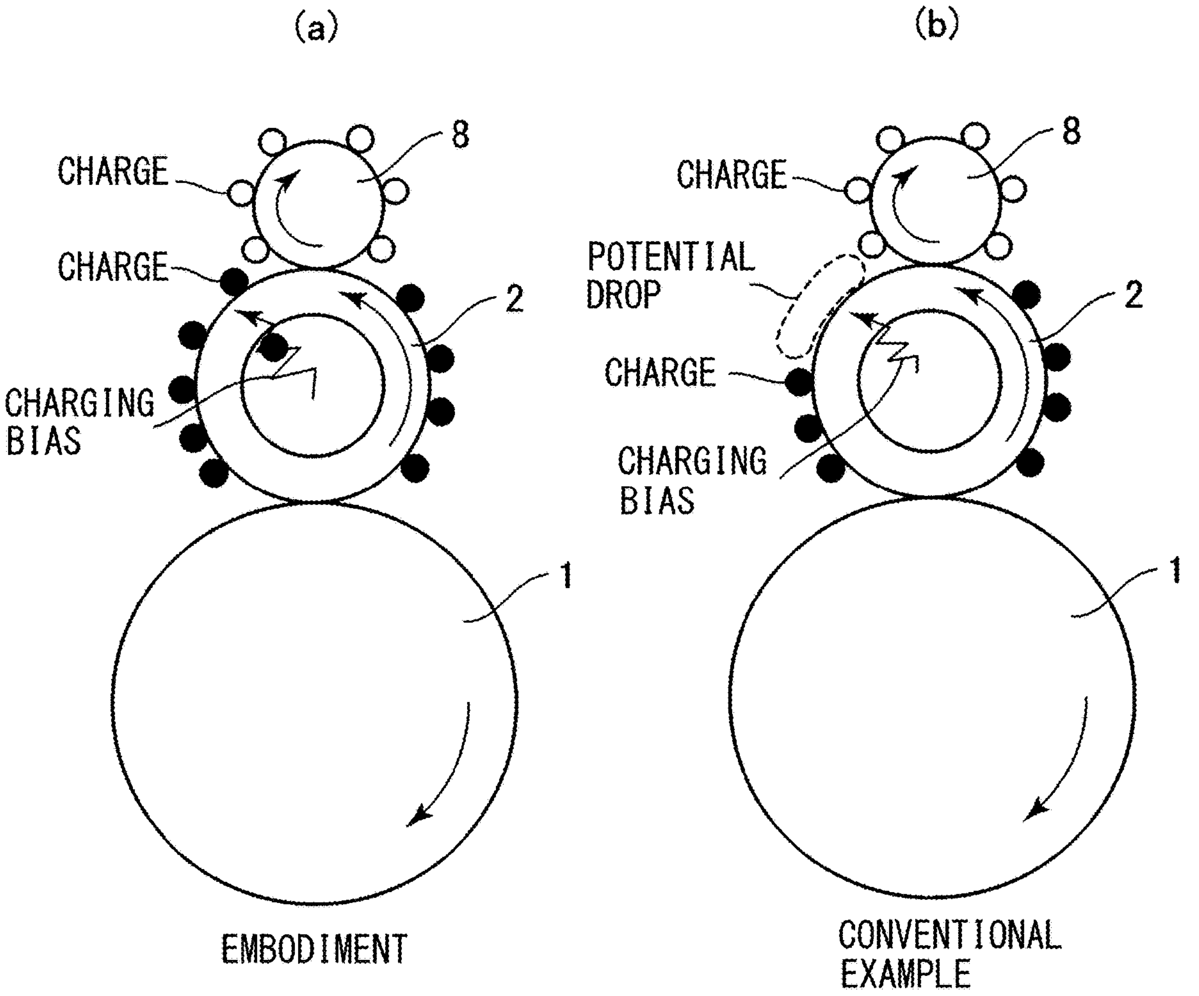

Parts (a) and (b) of FIG. 18 are schematic views for illustrating an outline of the present invention.

DESCRIPTION OF THE EMBODIMENTS

In the following, an image forming apparatus according to the present invention will be described specifically with reference to the drawings.

1. Outline of Embodiment

The present inventors analyzes a phenomenon such that a charging lateral stripe image generates, with the result that it turned out that the following occurs.

That is, in a constitution in which a cleaning roller contacts a charging roller, surfaces of these rollers are triboelectric charged each other, so that an absolute value of a surface potential of the charging roller lowers. Then, electric discharge on an upstream side of a contact portion between the charging roller and a photosensitive drum decreases, so that a charging lateral stripe image generates. This charging lateral stripe image is generated due to that an electric discharge amount in a minute gap on the upstream side of the contact portion between the charging roller and the photosensitive drum is decreased by the lowering in absolute value of the surface potential of the charging roller and then intermittent electric discharge occurs in a minute gap on a downstream side of the contact portion.

In addition, as a result of intensive study, the present inventors have found that the charging lateral stripe image can be suppressed by that triboelectric charge is immediately attenuated by decreasing a time constant which is an index of attenuation of an electric charge of the charging roller and further by that an interval of occurrence of friction between the surface of the charging roller and the surface of the cleaning roller is made sufficiently longer than the time constant.

Further, the present inventors measure the surface potential of the charging roller while rotating the cleaning roller and the charging roller in contact with each other in a constitution in which the charging lateral stripe image generates.

As a result, it turned out that the lowering in absolute value of the surface potential of the charging roller due to the triboelectric charge as described below is a cause of occurrence of the charging lateral stripe image.

Parts (a) and (b) of FIG. 18 are schematic views for illustrating an occurrence factor of the charging lateral stripe image. Part (a) of FIG. 18 schematically shows a state of the surface potential of the charging roller in a constitution of this embodiment, and part (b) of FIG. 18 schematically shows a state of a surface potential of a charging roller in a comparison example.

Triboelectric charge between a charging roller 8 and a charging roller 2 was measured. For example, it turned out that in the case where a voltage of −1000 V is applied to the cleaning roller 8 and a voltage of −1000 V is applied to the charging roller 2 at the same time, when rotation of the charging roller 2 and the cleaning roller 8 is started, the surface potential of the cleaning roller 8 is changed to an about −700 V by the triboelectric charge. That is, it can be predicted that a status of generation of a triboelectric charge potential of +300 V on the surface of the cleaning roller 8 is formed.

Further, when the surface potential of the charging roller 2 at this time is measured, by the influence of the potential of +300 V possessed by the cleaning roller 8, although the voltage of −1000 V is applied to the charging roller 2, the absolute value of the surface potential was lowered to about −800 V. Further, at this time, the charging lateral stripe image generated at the time. It would be considered that when the absolute value of the surface potential of the charging roller 2 lowers, the electric discharge in the upstream-side minute gap of the contact portion between the charging roller 2 and a photosensitive drum 1 decreases and intermittent electric discharge generates in the downstream-side minute gap of the contact portion, with the result that the charging lateral stripe image generates.

In view of such a result, the present inventors have arrived at conception that the triboelectric charge between the cleaning roller 8 and the charging roller 2 may only be attenuated immediately in order to improve the charging lateral stripe image generating in a constitution in which the cleaning roller 8 is contacted to the charging roller 2.

Specifically, the time constant of the charging roller 2 is made a view in a range sufficiently smaller than a time interval in which the triboelectric charge generates between the surface of the charging roller 2 and the surface of the cleaning roller 8.

2. Image Forming Apparatus

<General Constitution of Image Forming Apparatus>

Figure 1:
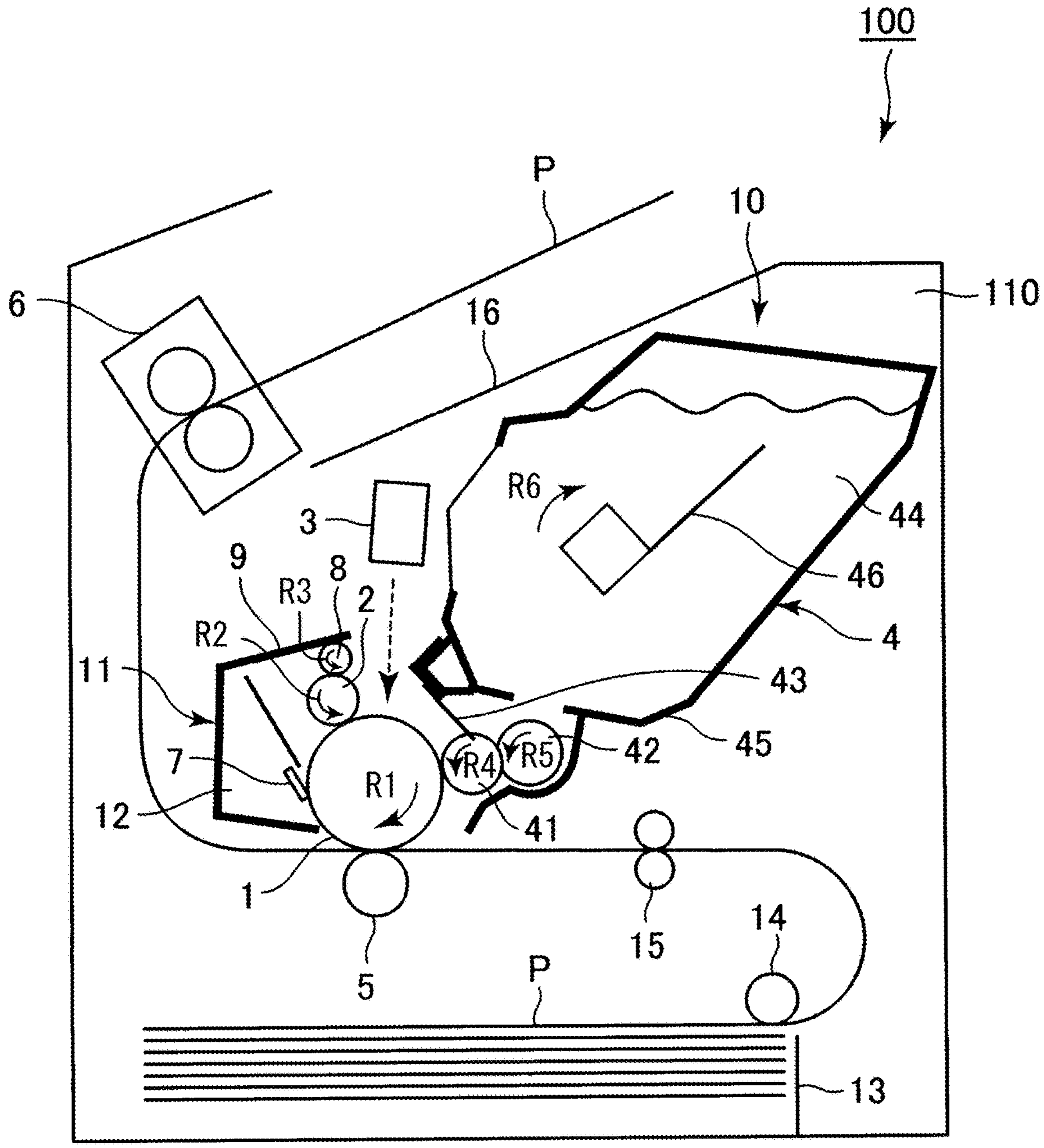
FIG. 1 is a schematic sectional view of an image forming apparatus.

A general constitution of an image forming apparatus 100 of this embodiment will be described with reference to FIG. 1. FIG. 1 is a schematic sectional view of the image forming apparatus 100 of this embodiment.

The image forming apparatus 100 includes a process cartridge 10 detachably mounted to an apparatus main assembly 110. The apparatus main assembly 110 of the image forming apparatus 100 is a portion excluding the process cartridge 10 from the image forming apparatus 100. The process cartridge 10 includes a rotatable photosensitive drum 1 as an image bearing member. Further, the process cartridge 10 includes, around the photosensitive drum 1, the charging roller 2, a developing roller 41, a cleaning blade 7, and the like.

The charging roller 2 electrically charges a surface of the photosensitive drum 1. Further, the developing roller 41 develops an electrostatic latent image, formed on the surface of the photosensitive drum 1, with toner 44. That is, the electrostatic latent image formed on the surface of the photosensitive drum 1 is developed as a toner image by toner carried on the developing roller 41 and charged to a normal charge polarity (holding a normal electric charge). Further, the cleaning blade 7 cleans the surface of the photosensitive drum 1. Further, the process cartridge 10 includes the cleaning roller 8 provided in contact with the charging roller 2, a supplying roller 42 and a developing blade 43 which are provided in contact with the developing roller 41, and the like. The cleaning roller 8 cleans the surface of the charging roller 2. The supplying roller 42 supplies the toner to the developing roller 41 and peels off the toner from the developing roller 41. The developing blade 43 regulates an amount (layer thickness) of the toner on the developing roller 41 and imparts an electric charge to the toner.

Further, the image forming apparatus 100 includes a transfer roller 5, an exposure device 3, and the like which are mounted to the apparatus main assembly 110. The transfer roller 5 contacts the photosensitive drum 1 and transfers the toner image from the photosensitive drum 1 onto a recording material P. Further, the exposure device 3 forms the electrostatic latent image, corresponding to image data, on the charged surface of the photosensitive drum 1.

Figure 2:
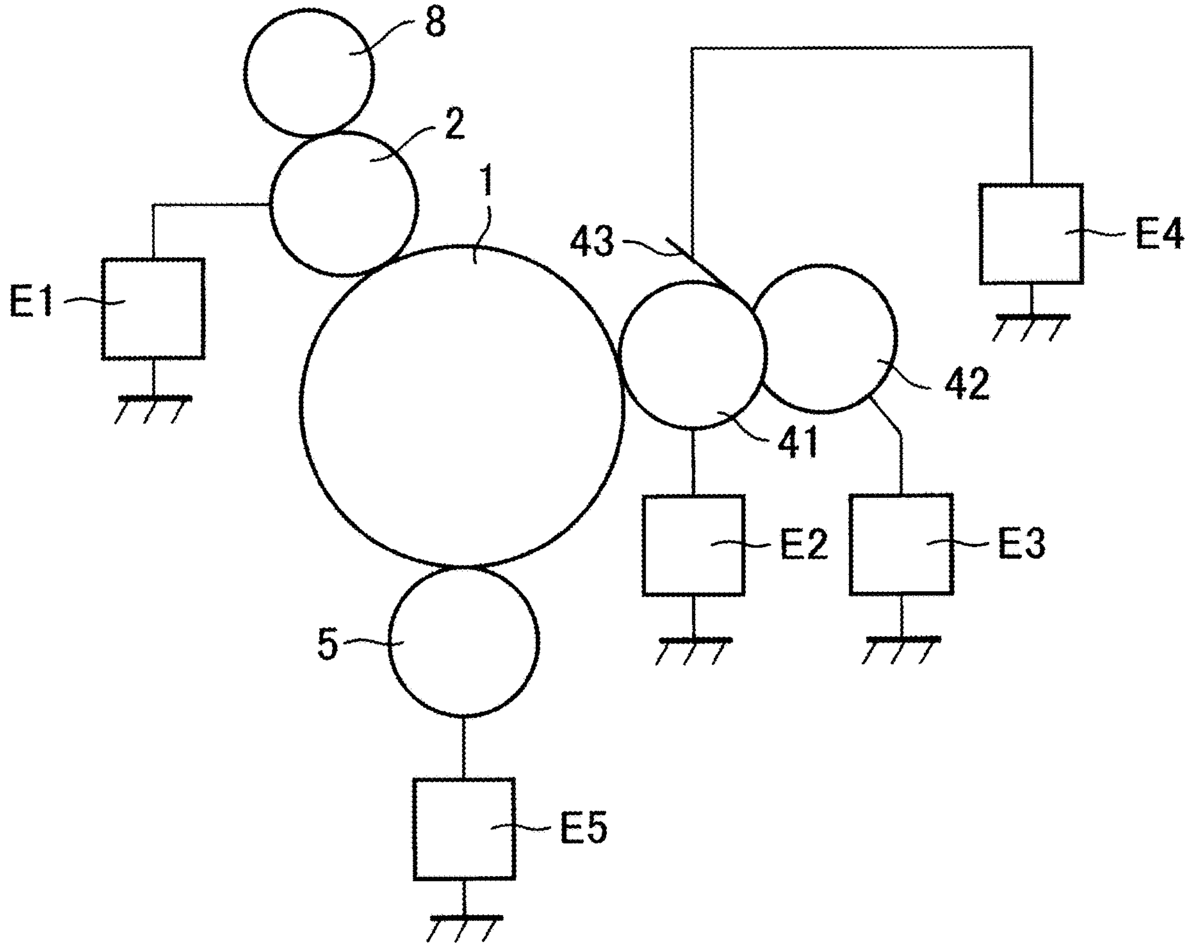
FIG. 2 is a schematic view for illustrating a constitution of a voltage applying portion of the image forming apparatus.

Further, FIG. 2 is a schematic view showing a power source constitution of the image forming apparatus 100. As shown in FIG. 2, the image forming apparatus 100 includes various power sources, such as a charging power source E1, a developing power source E2, a supply power source E3, a regulating process cartridge E4, and a transfer power source E5, which are mounted to the apparatus main assembly 110. The charging power source E1 as a charging voltage applying portion applies a predetermined charging voltage (charging bias) to the charging roller 2. In this embodiment, as an output source of the charging voltage, a DC high-voltage power source is used. The developing power source E2 as a developing voltage applying portion applies a predetermined developing voltage (developing bias) to the developing roller 41. In this embodiment, as an output source of the developing voltage, a DC high-voltage power source is used. The supply power source E3 as a supply voltage applying portion applies a predetermined supply voltage (supply bias) to the supplying roller 42. In this embodiment, as an output source of the supply voltage, a DC high-voltage power source is used. The regulating power source E4 as a regulating voltage applying portion apples a predetermined regulating voltage to the developing blade 43. In this embodiment, as an output source of the regulating voltage, a DC high-voltage power source is used. The transfer power source E5 as a transfer voltage applying portion applies a predetermined transfer voltage (transfer bias) to the transfer roller 5. In this embodiment, as an output source of the transfer voltage, a DC high-voltage power source is used.

Further, the image forming apparatus 100 includes a fixing device 6, as a fixing means, mounted to the apparatus main assembly 110. In this embodiment, the fixing device 6 is of a heat-fixing type in which fixing of an image on the photosensitive member P is performed by heating and melting the toner on the photosensitive member P. The fixing device 6 includes a fixing film, a fixing heater such as a ceramic heater for heating the fixing film, and a pressing roller press-contacting the fixing film.

<Constitution of Respective Portions of Image Forming Apparatus>

The photosensitive drum 1 is a photosensitive member (electrophotographic photosensitive member) of a rotatable drum type (cylindrical shape).

In this embodiment, the photosensitive drum 1 includes a photosensitive layer formed with a negatively chargeable organic photosensitive member on a drum-shaped base formed of aluminum. Further, the photosensitive drum 1 is 24 mm in outer diameter and is rotationally driven in an arrow R1 direction (clockwise direction) in FIG. 1 at a predetermined peripheral speed (surface measurement speed) by a driving force transmitted from a drum driving motor D1 (FIG. 3) which is a driving source constituting a driving device as a driving means. The peripheral speed of the photosensitive drum 1 corresponds to a process speed of the image forming apparatus 100. In this embodiment, the photosensitive drum 1 is rotationally driven at a peripheral speed of 260 mm/sec.

The charging roller 2 is a roller-shaped charging member as a charging means. The charging roller 2 is constituted by an elastic roller and includes a core metal (supporting member) and an electroconductive layer (electroconductive elastic layer) formed with an electroconductive rubber as an elastic layer covering the core metal. In this embodiment, an outer diameter (diameter) of the core metal of the charging roller 2 is 6 mm, and an outer diameter of the elastic layer (electroconductive layer) of the charging roller 2 is 8.5 mm. The charging roller 2 is press-contacted to the surface of the photosensitive drum 1 by a predetermined pressing force and is rotated in an arrow R2 direction (counterclockwise direction) in FIG. 1 with rotation of the photosensitive drum 1.

Further, the cleaning roller 8 is a roller-shaped cleaning member as a cleaning member. The cleaning roller 8 is constituted by an elastic roller and includes a core metal (rotation shaft) and a foamed elastic layer (formed elastic (member) layer) formed with an urethane sponge as an elastic layer covering the core metal. In this embodiment, the cleaning roller 8 is provided on an upper side of the charging roller 2 with respect to a vertical direction. In this embodiment, an outer diameter (diameter) of the cleaning roller 8 is 4 mm, and an outer diameter of a cylindrical elastic layer (foamed elastic layer) is 6 mm. The cleaning roller 8 is press-contacted to the surface of the charging roller 2 by a predetermined pressing force and is rotationally driven in an arrow R3 direction (clockwise direction) in FIG. 1 with rotation of the charging roller 2.

A rotational axis of the charging roller 2 and a rotational axis of the cleaning roller 8 are substantially parallel to each other. Further, the charging roller 2 and the cleaning roller 8 are rotatably supported by a cleaning container 9 described later through a bearing member (not shown).

The exposure device 3 as an exposure means is constituted by a laser scanner device (scanner unit, laser exposure unit). The exposure device 3 irradiates the surface of the photosensitive drum 1 by using a polygon mirror with laser light corresponding to image information inputted from an image reading device or an external device such as a personal computer, so that the surface of the photosensitive drum 1 is subjected to scanning exposure. By this, on the surface of the photosensitive drum 1, an electrostatic latent image (electrostatic image) depending on image information is formed. Incidentally, the exposure device 3 is not limited to the laser scanner device, and for example, an LED exposure device including an LED array in which a plurality of LEDs are arranged along a longitudinal direction (rotational axis direction) of the photosensitive drum 1 may be employed.

The image forming apparatus 100 includes the charging power source (high-voltage power source) E1 for applying the charging voltage to the charging roller 2.

When a potential difference between a surface potential of the photosensitive drum 1 and a potential of the charging roller 2 is made an electric discharge start voltage or more by applying the charging voltage to the core metal of the charging roller 2, the electric discharge is started, so that the surface of the photosensitive drum 1 is uniformly charged. By this, a dark-portion potential V D is formed on the surface of the photosensitive drum 1. Specifically, for example, as the charging voltage, a DC voltage of −1050 V is applied to the charging roller 2, and the dark-portion potential VD of the surface of the photosensitive drum 1 at this time is −500 V (VD reference value). The charged surface of the photosensitive drum 1 is irradiated with laser light, based on image information, from the exposure device 3 through an exposure opening of the process cartridge 10. By this, the electric charge of the surface of the photosensitive drum 1 is removed by an electric charge carrier from a carrier generating layer in the photosensitive layer of the photosensitive drum 1, so that a light-portion potential is formed on the surface of the photosensitive drum 1. The light-portion potential VI of the surface of the photosensitive drum 1 at this time is, for example, −100 V. Thus, on the surface of the photosensitive drum 1, the electrostatic latent image which is an image formed by the dark-portion potential VD and the light-portion potential VL. This electrostatic latent image is developed (visualized with toner 44.

A developing device 4 as a developing means includes the developing roller 41 as a developing member (developer carrying member) and a developing (device) container 45 which is a frame of the developing device 4 includes the supplying roller 42 as a supplying member (supplying and peeling-off member) for supplying the toner to the developing roller 41 and for peeling off the toner from the developing roller 41, and includes the developing blade 43 as a regulating member for regulating an amount (layer thickness) of the toner on the developing roller 41 and for imparting the electric charge to the toner on the developing roller 41. The developing roller 41 and the supplying roller 42 are rotatably supported by the developing container 45. Further, in this embodiment, the developing roller 41 is 10 mm in outer diameter. The developing roller 41 is disposed so that a part thereof is exposed to an outside through a development opening which is an opening provided in a position opposing the photosensitive drum 1 in the developing container 45. The supplying roller 42 is disposed so as to contact the developing roller 41 and applies, onto the surface of the developing roller 41, the toner 44 as a developer accommodated in the developing container 45. Incidentally, when a constitution in which the toner 44 can be sufficiently supplied to the developing roller 41 is employed, the supplying roller 42 is not necessarily required to be used. Further, the developing blade 43 is disposed so as to contact the surface of the developing roller 41 and is supported by the developing container 45.

In this embodiment, the developing device 4 uses a contact developing type as a developing type. That is, a toner layer carried on the developing roller 41 contacts the photosensitive drum 1 in a developing portion (developing region) where the photosensitive drum 1 and the developing roller 41 oppose each other. To the developing roller 41, a developing voltage is applied by the developing power source (high-voltage power source) E2. In this embodiment, for example, to the developing roller 41, a DC voltage of −300 V is applied as the developing voltage. When the developing voltage is applied to the developing roller 41, the toner carried on the developing roller 41 is moved from the developing roller 41 to the surface of the photosensitive drum 1. By this, the toner is deposited on the electrostatic latent image, so that the toner image is formed on the surface of the photosensitive drum 1. Incidentally, in this embodiment, the image forming apparatus 100 employs a reverse development type. That is, on a region (exposure portion) of the surface of the photosensitive drum attenuated in electric charge amount by being exposed to light in an exposure step after being charged in a charging step, the toner charged to the same polarity as a charge polarity (negative polarity in this embodiment) of the photosensitive drum 1, so that the toner image is formed.

In this embodiment, as the toner, toner having an average particle size of 7 μm and having the negative polarity which is a normal charge polarity (normal polarity) is used. The normal polarity of the toner is a principal charge polarity of the toner during development. Further, in this embodiment, this toner is polymerization toner manufactured by a polymerization method as an example. Further, in this embodiment, this toner is a so-called non-magnetic one-component developer which does not contain a magnetic component and which is carried on the developing roller 41 principally by an intermolecular force and an electrostatic force (mirror force). However, as the toner, a magnetic one-component developer containing the magnetic component may be used.

Further, in the one-component developer, in addition to toner particles, additives (such as wax and silica fine particles) for adjusting flowability and charging performance of the toner are contained in some cases. Further, as the developer, a two-component developer containing toner (non-magnetic toner particles) and a carrier (magnetic carrier particles) may be used. In the case where the developer having a magnetic property is used, as the developing member (developer carrying member), for example, a cylindrical developing sleeve in which a magnetic is provided.

Inside the developing container 45, a stirring member 46 as a stirring means is provided. The stirring member 46 is rotationally driven in an arrow roller 6 direction (clockwise direction) in FIG. 1 by a driving force transmitted from a motor which is a driving source constituting a driving device as a driving means. By this, the toner 44 in the developing container 45 is stirred, and in addition, is conveyed toward the developing roller 41 and the supplying roller 42. The stirring member 46 is rotationally driven at a predetermined rotational speed in interrelation with rotation of the developing roller 41 and the supplying roller 42. Incidentally, the stirring member is not limited to a stirring member in a rotation form. For example, a stirring member in a swing form may be employed.

The developing roller 41 is disposed so as to contact the surface of the photosensitive drum 1, in a developing portion where the photosensitive drum 1 and the developing roller 41 oppose each other. The developing roller 41 is rotationally driven in an arrow R4 direction (counterclockwise direction) in FIG. 1 at a predetermined peripheral speed by a driving force transmitted from a motor which is a driving source constituting a developing device as a developing means. In this embodiment, the developing roller 41 always contacts the photosensitive drum 1 also in a time other than during image formation. That is, in this embodiment, the image forming apparatus 100 is not provided with a contact and separation mechanism for separating the developing roller 41 from the photosensitive drum 1. In this embodiment, the developing roller 41 is rotationally driven at a peripheral speed which is 1.3 times the peripheral speed of the photosensitive drum 1.

The supplying roller 42 is disposed so as to contact the developing roller 41. The supplying roller 42 is rotationally driven in an arrow R5 direction (counterclockwise direction) at a predetermined peripheral speed by a driving force transmitted from a motor which is a driving source constituting a driving device as a developing means. The stirring member 46 is rotated, so that the toner 44 in the developing container 45 is stirred, and in addition, is supplied to the supplying roller 42. The supplying roller 42 is rotated, so that the supplying roller 42 supplies the toner to the developing roller 41, and in addition, removes the toner 44, remaining on the developing roller 41 after passing through the developing portion, from the developing roller 41 by peeling off the toner 44 from the developing roller 41. The toner 44 is removed from the developing roller 41 is mixed with the toner in the developing container 45. To the supplying roller 42, a supply voltage is applied by the supply (high-voltage power source) E3. In this embodiment, for example, a DC voltage of −400 V is applied as the supply voltage to the supplying roller 42.

The developing blade 43 is constituted by a plate-like elastic member and is disposed so as to contact the developing roller 41, so that the developing blade 43 is flexed against elasticity by the developing roller 41. The toner 44 supplied onto the developing roller 41 is regulated to a predetermined layer trade name in amount (layer thickness) by the developing blade 43, and in addition, the electric charge is imparted to the toner 44 by the developing blade 446. Thus, the toner layer formed on the developing roller 41 is conveyed to the developing portion where the photosensitive drum 1 and the developing roller 41 oppose each other. To the developing blade 43, a regulating voltage is applied by a regulating power source (high-voltage power source) E4. In this embodiment, for example, to the developing blade 43, a DC voltage of −400 V is applied as the regulating voltage.

Incidentally, in this embodiment, to the developing roller 41, the supplying roller 42, and the stirring member 46, the driving force is transmitted from the motor common to the driving source of the photosensitive drum 1 and the driving sources of the members 41, 42, and 46, but another driving source other than the driving source of the photosensitive drum 1 may be provided for at least one of these members.

A cleaning device 11 as a cleaning means includes a cleaning blade 7 as a cleaning member and a cleaning container 9 which is a frame of the cleaning device 11. The cleaning blade 7 is disposed so as to contact the surface of the photosensitive drum 1 and is supported by the cleaning container 9. The cleaning blade 7 scrapes off the toner (transfer residual toner), remaining on the surface of the photosensitive drum 1 after a transfer step, from the surface of the rotating photosensitive drum 1, and the toner is accommodated in a collected toner accommodating portion 12 formed in the cleaning container 9.

The process cartridge 10 is constituted by connecting the developing container 45 and the cleaning container 9 to each other.

<Image Forming Operation>

Next, an image forming operation of the image forming apparatus 100 will be described. When an image forming instruction is inputted into the image forming apparatus 100, an image forming process by the process cartridge 10 is started. The exposure device 3 irradiates the photosensitive drum 1 with laser light on the basis of the image information inputted from an image reading device connected to the image forming apparatus 100 or from an external device such as a personal computer. At this time, the photosensitive drum 1 is charged in advance by the charging roller 2, and is irradiated with the laser light, so that the electrostatic latent image is formed on the photosensitive drum 1. Thereafter, the electrostatic latent image is developed by the developing roller 41, so that the toner image is formed on the photosensitive drum 1.

The transfer roller 5 which is a roller-type transfer member as a transfer means forms a transfer portion in contact with the photosensitive drum 1. The toner image formed on the photosensitive drum 1 is transferred onto a sheet-like recording material (transfer material, recording medium, sheet) P, such as paper or a plastic sheet, nipped and conveyed by the photosensitive drum 1 and the transfer roller 5 in a transfer portion. During the transfer, to the transfer roller 5, a predetermined transfer voltage which is a DC voltage of an opposite polarity (positive polarity in this embodiment) to the normal polarity of the toner is applied by the transfer power source (high-voltage power source) E5.

The recording materials P are accommodated in a cassette 13 as a recording material accommodating portion. The recording materials P accommodated in the cassette 13 are separated one by one by a feeding roller 14 or the like as a feeding member and is sent from the cassette 13, and then the fed recording material P is conveyed to a registration roller pair 15 as a conveying member. This recording material P is conveyed by the registration roller pair 15 toward the transfer portion by being timed to the toner image on the photosensitive drum 1.

The recording material P on which the toner image is transferred is conveyed to the fixing device 6. The fixing device 6 heats and presses the recording material P passing through a nip between the fixing film and the pressing roller. By this, the toner particles on the recording material P are melted and thereafter are stuck, so that the toner image is fixed on the recording material P. The recording material P passed through the fixing device 6 is discharged (outputted) toward an outside (apparatus outside) of the apparatus main assembly 110 by a discharging roller pair (not shown) as a discharging means, and then is stacked on a discharge tray 16 as a stacking portion provided in an upper portion of the apparatus main assembly 110.

Further, transfer residual toner remaining on the photosensitive drum 1 after the transfer step is removed and collected from the photosensitive drum 1 by the cleaning device 11.

<Control Constitution>

Figure 3:
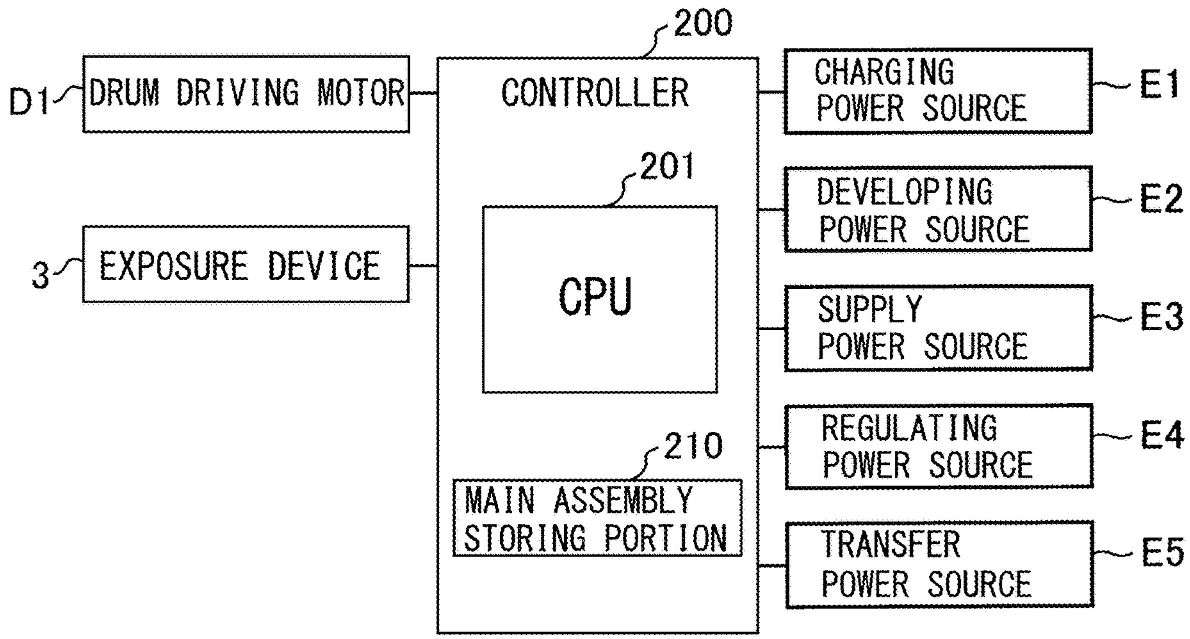
FIG. 3 is a block diagram showing a control constitution of the image forming apparatus.

FIG. 3 is a schematic black diagram showing a control constitution of the image forming apparatus 100 of this embodiment. The image forming apparatus 100 includes a controller 200 for integrally controlling respective portions of the image forming apparatus 100. The controller 200 includes a CPU 201 as an arithmetic processing means which is a central element for performing arithmetic processing. In addition, the controller 200 includes a main assembly storing portion 210, as a storing means (storing portion) for storing information, constituted by a ROM, a RAM, a non-volatile memory, and the like. In the ROM, a control program, a preliminarily acquired data table, and the like are stored. In the RAM, information inputted to the controller 200, detected information, an arithmetic processing result, and the like are stored. In the non-volatile memory, various pieces of setting information and the like are stored. The CPU 200 and the main assembly storing portion 210 are capable of transferring and reading data to and from each other. Further, the controller 200 includes an input/output portion (not shown) for giving and receiving signals between the controller 200 and the respective portions.

The controller 200, for example, a driving portion such as a drum driving motor D1 is connected. Further, to the controller 200, the various power sources such as the charging power source E1, the developing power source E2, the supply power source E3, the regulating power source E4, and the transfer power source E5 are connected. Further, to the controller 200, the exposure device 3, various sensors, and the like are connected. In addition, to the controller 200, arbitrarily, the image reading device and the external device (not shown) such as the personal computer are connected. The controller 200 is capable of controlling operations of the respective portions of the image forming apparatus 100 so as to carry out image formation depending on an image signal inputted from the external device. Incidentally, in this embodiment, the developing roller 41, the supplying roller 42, and the stirring member 46 are driven by transmitting thereto the driving force from the drum driving motor D1, but a dedicated driving source may be provided for at least one of these members 41, 42, and 46.

3. Charging Roller

<Outline Constitution of Charging Roller>

Figure 4:
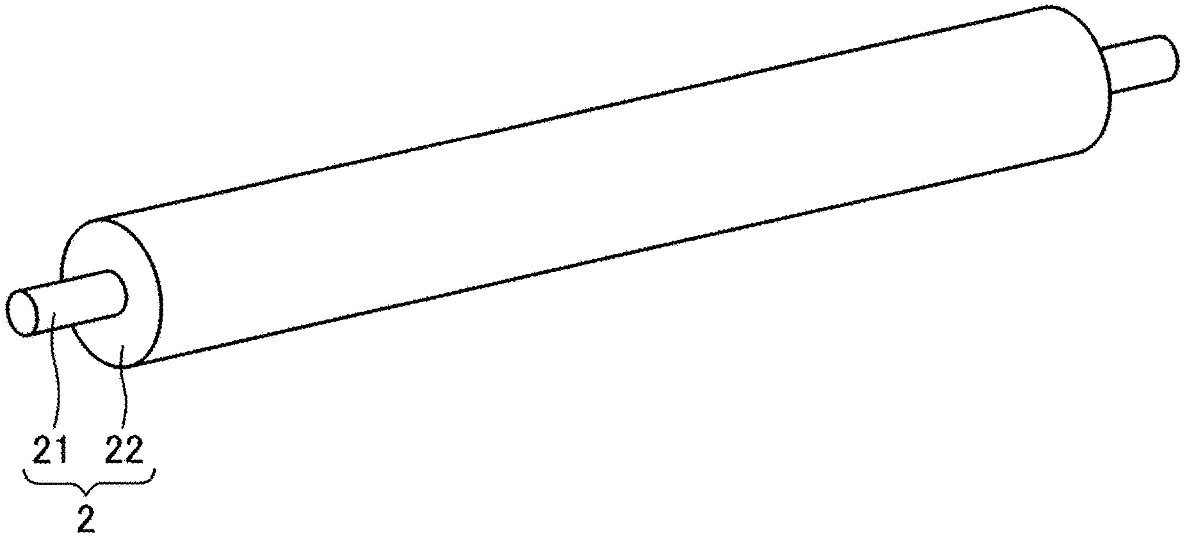
FIG. 4 is a schematic perspective view of an outer appearance of a charging roller.

FIG. 4 is a schematic perspective view of an outer appearance of an example of the charging roller 2. The charging roller 2 includes an electroconductive supporting member (core metal, shaft core) 21 and an electroconductive layer (elastic layer) 22 formed around the supporting member 21. The electroconductive layer 22 may only be required to have a constitution satisfying a condition of the above-described time constant. Specifically, it is possible to cite a constitution including only the electroconductive elastic layer 22 and a constitution including an electroconductive resin layer on a surface of the electroconductive elastic layer 22.

(Electroconductive Supporting Member>

The supporting member 21 used in the charging roller 2 has electroconductivity and a function of supporting the elastic layer 22 provided around the supporting member 21. As a material of the supporting member 21, it is possible to cite, for example, metals such as iron, copper, stainless steel, aluminum and nickel, and alloys thereof. Further, surfaces of these materials may be subjected to plating for the purpose of imparting scratch resistance. Further, as the supporting member 21, it is also possible to use a core shaft obtained by imparting electroconductivity to a surface of a resin base material by coating the surface with metal or the like, and a core shaft manufactured from an electroconductive resin composition.

Further, between the electroconductive supporting member 21 and the elastic layer 22, an adhesive layer as an adhesive may be provided. In this case, the adhesive may preferably have electroconductivity. In order to impart the electroconductivity, to the adhesive, material are appropriately selected from well-known electroconductive agents (for example, an ion-conductive agent or an electron-conductive agent) and can be used singly or in combination of two or more species.

As a binder of the adhesive, thermosetting resin and thermoplastic resin are cited, and it is possible to use well-known resin materials of an urethane type, an acrylic type, a polyester type, a polyether type, an epoxy type, and the like. As the adhesive, “METALOC N33” (manufactured by TOYOKAGAKU KENKYUSHO CO., LTD.) can be cited. As an applying method of the adhesive, it is possible to use a well-known method such as a roll coater, a sponge application, a spray application.

The adhesive layer between the electroconductive supporting member 21 and the elastic layer 22 may be provided in a whole region of a surface where the electroconductive supporting member 21 and the elastic layer 22 are in contact with each other or in a region of a part of the surface (contact surface). For example, with respect to a longitudinal direction (rotational axis direction) of the charging roller 2, in each of opposite end portions of the contact surface (between the electroconductive supporting member 21 and the elastic layer 22), the adhesive layer can be provided only in a range of 5 mm to 20 mm in width. Incidentally, the term “to” regarding the numerical range means that numerical values before and after “to”. As a thickness of the adhesive layer, from a viewpoint of an adhesive property between the supporting member (core shaft) 21 and the elastic layer 22, it is preferable that the thickness is 1 μm to 10 μm.

<Electroconductive Layer>

When a constitution in which a charge transport characteristic of the electroconductive layer (elastic layer) 22 satisfies the condition of the above-described time constant is employed, there is no limitation in constitution of the electroconductive layer 22. As the elastic layer 22, it is possible to use one or two or more kinds of elastic members such as rubbers used in elastic layers (electroconductive elastic (member) layers) of conventional charging rollers. As the rubbers, it is possible to cite urethane rubber, silicone rubber, butadiene rubber, isoprene rubber, chloroprene rubber, styrene-butadiene rubber, ethylene-propylene rubber, polynorbornene, styrene-butadiene-styrene rubber, acrylonitrile rubber, epichlorohydrin rubber, and alkyl ether rubber.

Further, the electroconductivity of the elastic layer 22 can be adjusted to a predetermined value by appropriately using an electroconductive agent. An electric resistance value of the elastic layer 22 can be adjusted by appropriately selecting a kind and a use amount of the electroconductive agent, and a suitable range of the electric resistance value is $10^2$ to $10^8$ Ω·cm, more suitably $10^3$ to $10^8$ Ω·cm. Further, as the electroconductive agent for the elastic layer 22, it is also possible to use electroconductive carbon such as Ketjen black, acetylene black, carbon for rubber, carbon for color (ink) subjected to oxidation treatment, thermal decomposition carbon, and the like. Further, as the electroconductive agent for the elastic layer 22, it is possible to use graphite such as natural graphite and artificial graphite. To the elastic layer 22, an inorganic or organic filler and cross-linking agent may be added.

<Elastic Layer Having Matrix Domain Structure>

As the charging roller 2, an electroconductive roller including the elastic layer 22 having a matrix domain structure is suitably used. The matrix domain structure is a structure including a matrix and a plurality of domains dispersed in the matrix.

<Method of Forming Matrix Domain Structure>

A specific example of a means for forming the elastic layer 22 having the matrix domain structure in the charging roller 2 will be described.

A constitution including the domains as an electroconductive phase and the matrix as an insulating phase can be obtained by a method in which an electroconductive material and an insulative material are phase-separated or dispersed within a range not inhibiting an effect of the present invention. In the method, the electroconductive layer (elastic layer) 22 having a phase separation structure of a matrix domain type obtained by phase separation between a matrix containing a first rubber, and a second rubber having electroconductivity may preferably be used. The electroconductive layer 22 has the matrix domain structure, so that the electric charge is transported along the electroconductive domains and thus it becomes easy to put the time constant in the range of the present invention. In an interface between the electroconductive domains and the insulating matrix, the electric charge is at rest for a certain time and is accumulated in the domains, and then an electroconductive mechanism is achieved between the domains, so that it would be considered that a state in which the electric charges are abundantly present in the electroconductive layer 22.

The elastic layer 22 having the matrix domain structure in the charging roller 2 may preferably be an electroconductive member satisfying the following constitution elements (i) and (ii). In the following, as regards the electroconductive member, the charging roller 2 will be described as an example, but the electroconductive member is not limited to the charging roller 2.

Constitution element (i): A volume resistivity of the matrix is more than $1.0\times10^8$ Ω·cm and is $1.0\times10^{17}$ Ω·cm or less.

Constitution element (ii): A volume resistivity of the domains is $1.0\times10^7$ Ω·cm or more and $1.0\times10^4$ Ω·cm or less.

Figure 5:
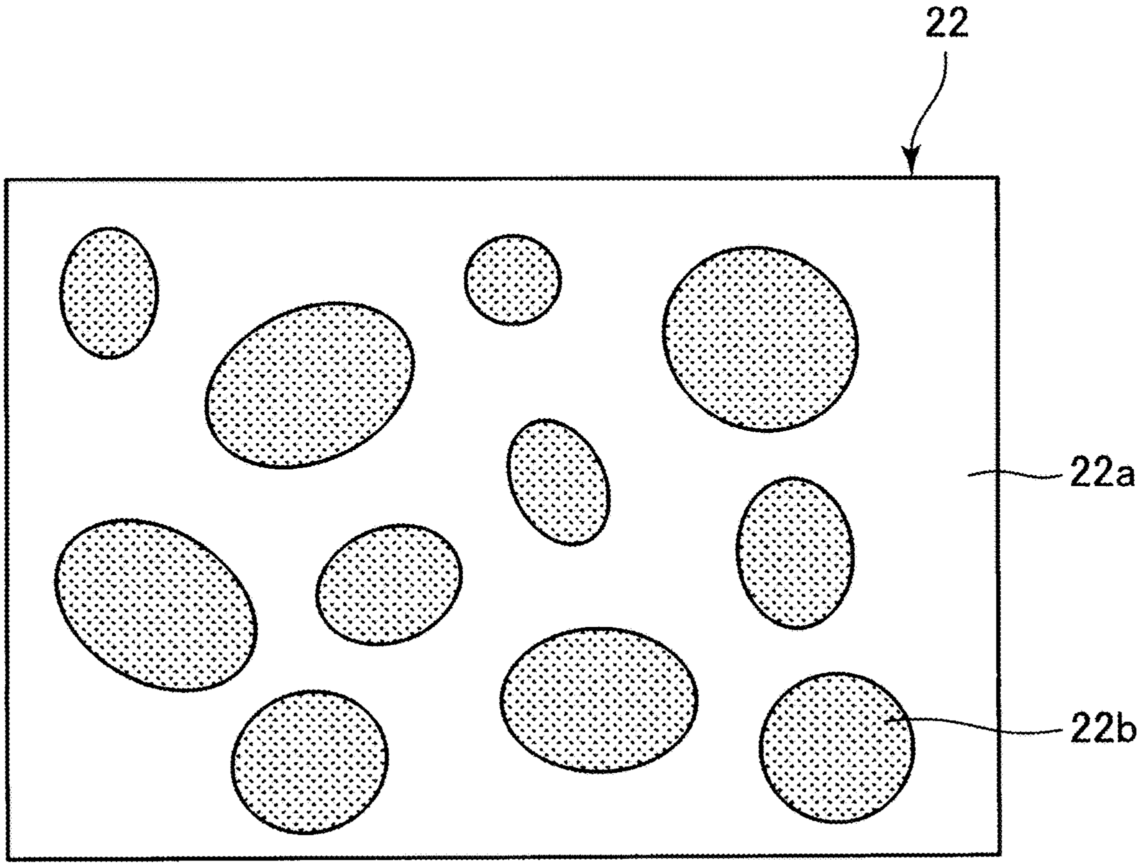
FIG. 5 is a schematic sectional view of an elastic layer of the charging roller.

FIG. 5 is a schematically partially sectional view (showing a cross section substantially perpendicular to a rotational axis of the charging roller 2. The elastic layer 22 has a matrix domain structure (matrix-domain structure) including a matrix 22*a* and domains 22*b*. Further, the domains 22*b* contain electroconductive particles as an electron-conductive agent.

<Measuring Method of Volume Resistivity of Matrix>

The volume resistivity of the matrix can be measured by a minute probe after the elastic layer 22 is sliced. As a slicing means, it is possible to cite, for example, a sharp razor, a microtome, a focused ion beam (FIB) method, and the like.

For preparation of a thin piece (slice sample), there is a need to measure the volume resistivity of only the matrix while excluding the influence of the domains, and therefore, there is a need to prepare the thin piece having a film thickness less than a domain-to-domain distance measured in advance by a scanning electron microscope (SEM) or a transmission electron microscope (TEM). Accordingly, as the slicing means, a means such as the microtome capable of preparing a very thin sample may preferably be used.

For measurement of the volume resistivity, first, one side of the above-described thin piece is grounded, and then, places of the matrix and the domains in the thin piece are specified. Specification of these places can be made by a means capable of measuring the volume resistivity or a hardness distribution of the matrix and the domains by a scanning probe microscope (SPM), an atomic force microscope (AFM), or the like. Then, the probe is contacted to the matrix, and an arithmetic average value of a ground current value or 5 seconds is measured under application of a DC voltage of 50 V for 5 seconds and then is divided by the voltage, so that an electric resistance value is calculated. Then, the electric resistance value may only be required to be converted into volume resistivity by using the film thickness of the thin piece. At this time, when a means, such as the SPM or the AFM, capable of also measuring a shape the thin piece is used, the film thickness of the thin piece can be measured, and thus the volume resistivity is measurable and therefore this means is suitable.

Measurement of volume resistivity of the matrix in a cylindrical electroconductive member (charging roller 2) can be made as in the following manner. A single thin piece sample is cut from each of regions obtained by dividing the elastic layer 22 to 4 areas with respect to a circumference direction and regions obtained by dividing the elastic layer 22 into 5 areas with respect to a longitudinal direction (rotational axis direction of the charging roller 2) and the above-described measured value is obtained, and thereafter an arithmetic average value of the volume resistivity of 20 samples in total is calculated, so that the measurement of the volume resistivity of the matrix can be made.

<Volume Resistivity of Domains>

The volume resistivity of each of the domains is smaller than the volume resistivity of the matrix. By this, an electric charge transportation path is easily limited to a path through the plurality of domains while suppressing unintended movement of the electric charge in the matrix, and therefore is preferable. Further, the volume resistivity of the domain may preferably be larger than the volume resistivity of the matrix by 5 digits or more. The volume resistivity of the domain may preferably be $1.0\times10^1$ Ω·cm or more and $1.0\times10^4$ Ω·cm or less. By putting the volume resistivity of the domain in a lower state, the electric charge transportation path can be limited to a path, effectively through the plurality of domains, while suppressing the unintended movement of the electric charge in the matrix. By lowering the volume resistivity of the domain to the above-described range, an amount of the electric charge moved in the domain can be remarkably improved, and therefore, the electric charge transportation path can be effectively limited to the path through the domains.

The volume resistivity of the domain can be adjusted by using an electroconductive agent in a rubber component of the domains so as to make the electroconductivity a predetermined value. The volume resistivity of the domain can be adjusted by appropriately selecting a kind and an addition amount of the electron-conductive agent.

As an electroconductive agent used for controlling the volume resistivity of the domain to $1.0\times10^{1}$ Ω·cm or more and $1.0\times10^{4}$ Ω·cm or less, the electron-conductive agent capable of largely changing the volume resistivity from a high resistance to a low resistance depending on a dispersion amount may preferably be used.

As regards the electron-conductive agent mixed in the domains, carbon black, graphite, oxides such as titanium oxide or tin oxide, metal such as Cu or Ag, particles surface-coated with the oxide or metal so as to be made electroconductive are cited as an example. Further, as needed, two or more kinds of these electroconductive agents may be used and mixed in an appropriate amount.

Of the above-described electron-conductive agents, the electroconductive carbon black which has a large affinity with the rubber and which is easy to control a distance between the electron-conductive agents may preferably be used. The kind of the carbon black mixed in the domains is not particularly limited. Specifically, it is possible to cite gas furnace black, oil furnace black, thermal black, lamp black, acetylene black, Ketjen black, and the like, for example.

Further, as needed, a filler, a processing aid, a cross-linking aid, a cross-linking promoter, an antioxidant, a cross-linking promoter aid, a cross-linking retardant, a softener, a dispersant, a colorant, and the like, which are ordinarily used as compounding ingredients for the rubber may be added into a rubber composition for the domains within a range not inhibiting the effect of the present invention.

<Measuring Method of Volume Resistivity of Domain>

Measurement of the volume resistivity of the domain may only be required to be carried out by a method similar to the above-described measuring method of the volume resistivity of the matrix except that the measuring portion is changed to a place corresponding to the domain and that an applied voltage when a current value is measured is changed to 1 V.

<Charging Roller Manufacturing Method>

The electroconductive member (charging roller 2) can be manufactured by, for example, a method including the following steps (i) to (iv):

- Step (i): a step of preparing a domain-forming rubber mixture containing the carbon black and a second rubber (hereinafter, this mixture is also referred to as a "CMB"),
- Step (ii): a step of preparing a matrix-forming rubber mixture containing a first rubber (hereinafter, this mixture is also referred to as an "MRC"),
- Step (iii): a step of preparing a rubber mixture having the matrix domain structure by kneading the CMB and the MRC, and
- Step (iv): a step of forming the elastic layer 22 by forming a layer of the rubber mixture prepared in the step (iii) on the electroconductive supporting member 21 directly or through another layer and then by curing the layer of the rubber composition (mixture).

Further, the constitution element (i) and the constitution element (ii) can be controlled by, for example, selecting materials used in the above-described steps and adjusting a manufacturing condition. Description thereof will be made in the following.

First, as regards the constitution element (i), the volume resistivity of the matrix is determined by a composition of the MRC. As the first rubber used in the MRC, a least one kind of rubbers, low in electroconductivity, such as natural rubber, butadiene rubber, butyl rubber, acrylonitrile butadiene rubber, urethane rubber, silicone rubber, fluorine-containing rubber, isoprene rubber, chloroprene rubber, styrene-butadiene rubber, ethylene-propylene rubber, and polynorbornene rubber can be used. Further, on the premise that the volume resistivity of the matrix can be caused to fall within the above-described range, to the MRC, as needed, a filler, a processing aid, a cross-linking agent, a cross-linking aid, a cross-linking promoter, a cross-linking promoter aid, a cross-linking retardant, an antioxidant, a softener, a dispersant, and a colorant may be added. On the other hand, in the MRC, it is preferable that the electron-conductive agent such as the carbon black is not contained in order to put the value of the matrix within the above-described range.

Further, as regards the constitution element (ii), the volume resistivity of the domain can be adjusted by an amount of the electron-conductive agent in the CMB. For example, the case where the electroconductive carbon black having a DBP oil absorption (amount) of 40 $cm^3$/100 g or more and 170 $cm^3$/100 g or less is cited as an example. In this case, by preparing the CMB so as to contain the electroconductive carbon black in 40 mass % or more and 200 mass % or less on the basis of a total mass of the CMB, the constitution element (ii) can be achieved. Here, as a specific example of the second rubber usable in the CMB, it is possible to cite, for example, natural rubber (NR), isoprene rubber (IR), butadiene rubber (BR), styrene-butadiene rubber (SBR), butyl rubber (IIR), ethylene-propylene rubber (EPM, EPDM), chloroprene rubber (CR), nitrile rubber (NBR), hydrogenated nitrile rubber (H-HBR), silicone rubber, and urethane rubber (U). At least one kind of these rubbers can be used.

<Confirmation Method of Matrix Domain Structure)

Presence of the matrix domain structure in the elastic layer 22 can be confirmed by detailed observation of a fracture surface thereof formed on a thin piece prepared by slicing the elastic layer 22.

As a slicing means, for example, a sharp razor, a microtome, an FIB, and the like can be cited. Further, in order to perform more accurate observation of the matrix domain structure, the thin piece for observation may be subjected to pre-treatment, such as dyeing treatment or vapor deposition treatment, in which a contrast between the domains as an electroconductive phase and the matrix as an insulating phase is suitably obtained.

Thin piece for which the fracture surface is formed and the pre-treatment is performed as needed is subjected to observation of the fracture surface through the scanning electron microscope (SEM), the transmission electron microscope (TEM), or the like, so that the presence of the matrix domain structure can be confirmed. As a method of simply and accurately confirming a sea-island structure (matrix domain structure), it is preferable to observe the fracture surface by the scanning electron microscope (SEM).

The thin piece of the elastic layer 22 is obtained by the method as described above, and then a surface of the thin piece is observed in magnification of 1,000 times to 10,000 times, so that an image is acquired. Thereafter, the image is subjected to image processing with an image analysis software ("Image-Pro Plus", manufactured by Media Cybernetics), in which the image is subjected to 8-bit gray scaling and thus a monochromatic image of 256 gradations is obtained. Then, the image is subjected to white/black inversion processing so that the domains in the fracture surface becomes white and then is subjected to binarization, so that an analysis image is acquired. By this analysis image acquired by putting the domains and the matrix in a distinguishable state by the binarization, presence or absence of the matrix domain structure may be discriminated.

In the case where as shown in FIG. 5, a structure such that a plurality of domains 22*b* present in a matrix 22*a* in an isolated state in the above-described analysis image, the presence of the matrix domain structure in the elastic layer 22 can be confirmed. The isolated state of the domains may only be required to be a state in which each of the domains is disposed in a state not connected with other domains and in which the matrix is continuous and the domains are separated by the matrix.

<Electroconductive Surface Layer>

Figure 6:
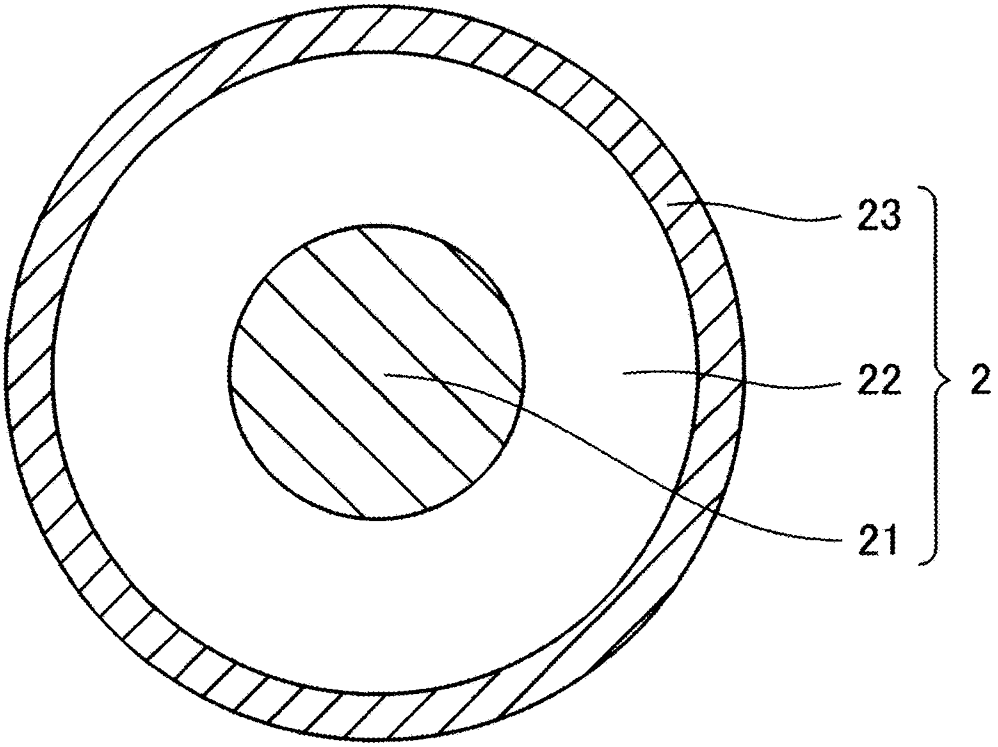
FIG. 6 is a schematic sectional view of the charging roller.
Figure 7:
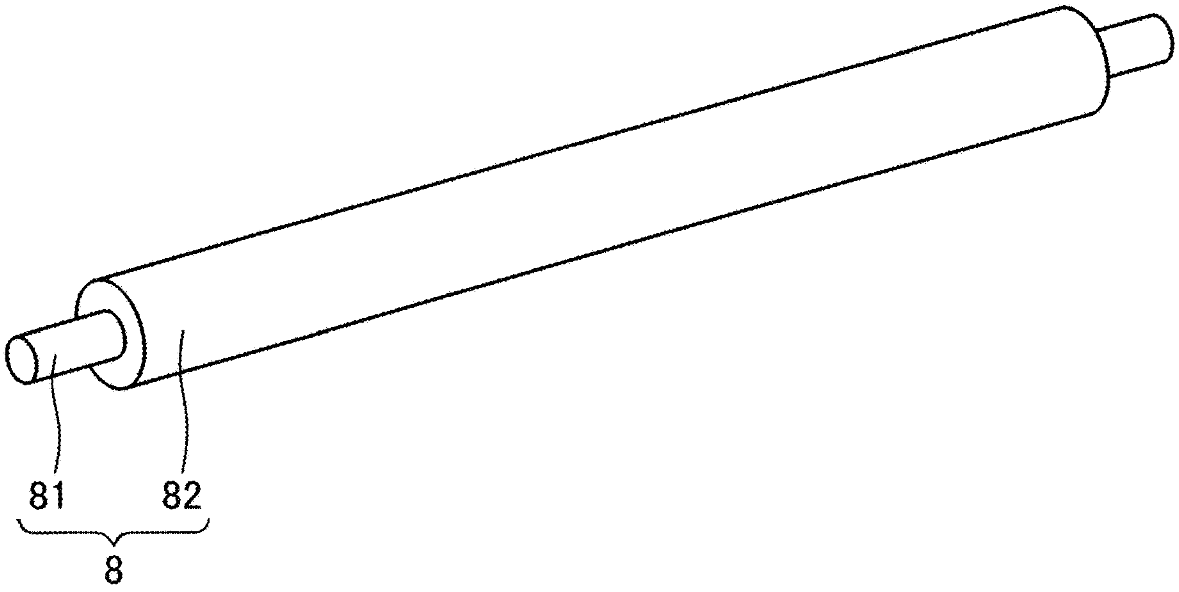
FIG. 7 is a schematic perspective view of an outer appearance of a cleaning roller.

It is preferable that the charging roller 2 includes an electroconductive surface layer 23 provided on the above-described electroconductive elastic layer 22. FIG. 6 is a schematic sectional view (showing a cross section substantially perpendicular to the rotational axis of the charging roller 2) of the charging roller 2 provided with the surface layer 23. By providing the electroconductive surface layer 23, movement of the electric charge on an outermost surface in a surface direction becomes efficient, and therefore, a time constant can be made smaller. The electroconductive surface layer 23 may only be required to be formed by adding an electroconductive agent to a binder.

Preferred volume resistivity of the electroconductive surface layer 23 may only be required to fall within a range satisfying the condition of the above-described time constant and specifically is $1.0\times10^5$ Ω·cm or more and $1.0\times10^9$ Ω·cm or less.

<Binder>

As a binder used in the surface layer 23, a well-known binder can be employed.

For example, it is possible to cite a resin, a natural rubber, vulcanized materials thereof, a synthetic rubber, and the like. As the resin, it is possible to use the resin such as thermosetting resin or thermoplastic resin. Of these resins, fluorine-containing resin, polyamide resin, acrylic resin, polyurethane resin, silicone resin, butyral resin, and the like are preferred.

The surface layer 23 may preferably contain an electroconductive substance. As the electroconductive substance, the electroconductive agent such as the ion-conductive agent or the electron-conductive agent can be used. As the ion-conductive agent, the following substances can be used. It is possible to cite inorganic ion substances such as lithium perchlorate, sodium perchlorate, and calcium perchlorate; cationic surfactants such as lauryltrimethylammonium chloride, stearyltrimethyl ammonium chloride, octadecyltrimethylammonium chloride, dodecyltrimethylammonium chloride, hexadecyltrimethylammonium chloride, trioctylpropylammonium chloride, and modified aliphatic dimethylethylammonium ethosulfate; amphoteric surfactants such as lauryl betaine, stearyl betaine, and dimethylalkyllauryl betaine; quaternary ammonium salts such as tetraethylammonium perchlorate, tetrabutylammonium perchlorate, and trimethyloctadecylammonium perchloride; and organic acid lithium salt such as lithium trifluoromethanesulfonate. These substances can be used singly or in combination of two or more species.

As the electron-conductive agent, the following substances can be used. It is possible to cite fine particles of metals such as aluminium, palladium, iron, copper, and silver; fibers; metal oxides, subjected to electroconductive treatment, such as titanium oxide, tin oxide, and zinc oxide; composite particles obtained by surface-treating the above-described metallic fine particles, fibers, and metal oxides by electrolytic treatment, spray coating, or mixing shaking; and carbon powder such as furnace black, thermal black, acetylene black, Ketjen black, PAN (polyacrylnitrile)-based carbon, and pitch-based carbon.

As the furnace black, it is possible to cite SAF-HS, SAF, ISA F-HS, ISAF, ISAF-LS, I-ISAF-HS, HAF-HS, HAF, HAF-LS, T-HS, T-NS, MAF, FEF, GPF, SRF-HS-HM, SRF-LM, ECF, and FEF-HS. As the thermal black, it is possible to cite FT and MT. These electroconductive agents can be used singly or in combination of two or more species.

Further, the electroconductive agent may preferably have an average particle size of 0.01 μm to 0.9 μm, further preferably 0.01 μm to 0.5 μm. In these ranges, it becomes easy to control the volume resistivity of the matrix. An addition amount of the electroconductive agent to the surface layer 23 may appropriately be in a range of 2 parts by mass to 80 parts by mass, preferably 20 parts by mass to 60 parts by mass, with respect to 100 parts by mass of the binder.

The electroconductive agent may be surface-treated. As a surface-treating agent, it is possible to use organosilicon compounds such as alkoxysilane, fluoroalkylsilane, and polysiloxane; various coupling agents of silane-based type, titanate-based type, aluminate-based type, and zirconate-based type; olygomers; and macromolecular compounds. These agents may be used singly or in combination of two or more species. Preferred agents are the organosilicon compounds such as alkoxysilane and polysiloxane and the various coupling agents of silane-based type, titanate-based type, aluminate-based type, and zirconate-based type, and a further preferred agent is the organosilicon compounds.

The surface layer 23 may be surface-treated. As the surface treatment, it is possible to cite surface processing treatment using UV radiation or electron beam, or surface modification treatment in which at least one of deposition of a compound or the like on the surface, and impregnation of the surface with the compound or the like is performed. The surface layer 23 may preferably have a thickness of 0.1 μm or more and 100 μm or less, more preferably 1 μm or more and 50 μm or less.

<Surface Layer Forming Method>

The surface layer 23 can be formed by a coating method such as an electrostatic spray coating or a dipping coating.

Or, the surface layer 23 can be formed by subjecting a sheet-shaped or tube-shaped layer, formed in a predetermined thickness in advance, to bonding or coating. Or, for forming the surface layer 23, it is also possible to use a method in which a material is hardened and molded in a predetermined shape in a mold. Of these methods, it is preferred to form a coating film by coating a coating material by the coating method. In the case where the layer is formed by the coating method, as a solvent used in the coating liquid, the solvent may only be required to be capable of dissolving the binder.

Specifically, it is possible to cite alcohols such as methanol, ethanol, and is propanol; ketones such as acetone, methyl ethyl ketone, and cyclohexanone; amides such as N,N-dimethylformamide and N, N-dimethylacetoamide; sulfoxides such as dimethylsulfoxide; ethers such as tetrahydrofuran, dioxane, and ethylene glycol monomethyl ether;

esters such as methyl acetate and ethyl acetate; aromatic compounds such as xylene, ligroin, chlorobenzene, and dichlorobenzene; and the like. These solvents are appropriately selected depending on the binder used. As a method of dispersing the binder and particles in the coating liquid, it is possible to use well-known solution dispersing means such as a ball mill, a sand mill, a paint shaker, Dyno-mill, and a pearl mill.

4. Cleaning Roller

<Constitution of Cleaning Roller>

Figure 9:
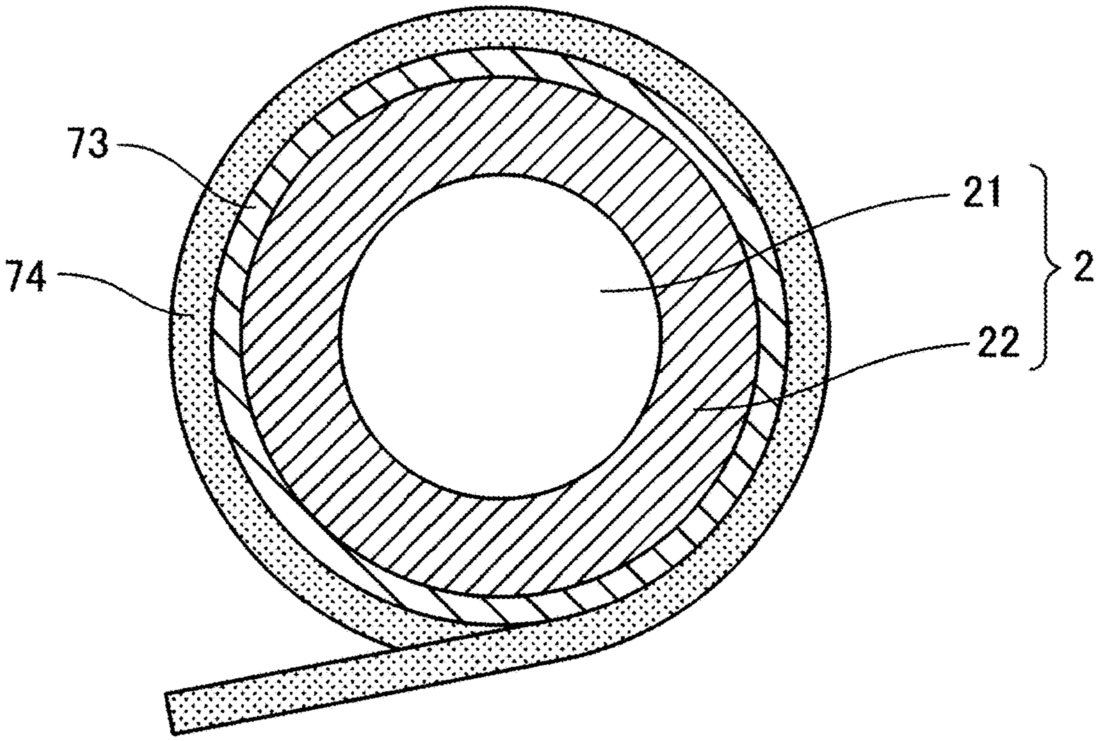
FIG. 9 is a schematic sectional view for illustrating the measuring method of the impedance of the charging roller.

FIG. 9 is a schematic perspective view of an outer appearance of an example of the cleaning roller 8. The cleaning roller 8 is a cleaning member for cleaning the charging roller 2 in contact with the charging roller 2. The cleaning roller 8 includes a rotation shaft (core metal, shaft core) 81 and an elastic layer 82 formed around the rotation shaft 81 and contacting the charging roller 2, and the elastic layer 82 is constituted by a foamed member (foamed elastic layer).

As a material of the foamed elastic layer 82, it is possible to cite, for example, materials comprising a single species of foamable resin (polyurethane, polyethylene, polyamide, or polypropylene or the like), a rubber material (silicone rubber, fluorine-containing rubber, urethane rubber, EPDM (ethylene-propylene-diene rubber), NBR (acrylonitrile-butadiene copolymer rubber), CR (chloroprene rubber), chlorinated polyisoprene, isoprene, acrylonitrile-butadiene rubber, styrene-butadiene rubber, hydrogenated polybutadiene, butyl rubber, or the like), or two or more species thereof in a blended form. Incidentally, to these materials as needed, aids such as a foaming aid, a foam stabilizer, a catalyst, a curing agent, a plasticizer, or a rubber (vulcanization) accelerator may be added.

The foamed elastic layer 82 may desirably be constituted by a foamed polyurethane strong in tension particularly from the viewpoints that a surface of a member-to-be-cleaned (charging roller 2) is not scarred by friction and that the layer is not torn or broken for a long term. As the polyurethane, for example, it is possible to cite a reaction product between a polyol (for example, polyester, polyol, polyether polyol, polyester/acrylic polyol, or the like) and an isocyanate (for example, 2,4-tolylene diisocyanate, 2,6-tolylene diisocyanate, 1,6-hexamethylene diisocyanate, or the like), and a chain extender (1,4-butanediol, trimethylolpropane) may be contained.

Further, foaming of the polyurethane is ordinarily performed by using a foaming agent such as water and azo compound (for example, azodicarbonamide, azobisisobutyronitrile, or the like). To the foamed polyurethane, as needed, aids such as foaming aid, foam stabilizer, and catalyst may be added.

Here, in order to remove a deposited matter (contaminants such as toner and external additive) on the surface of the charging roller 2, it is desirable that a contact pressure (contact state) of the cleaning roller 8 to the charging roller 2 is made 40 mN/mm or less. This contact pressure may be substantially 0 mN/mm (simply contacted state). This is because, in the case where the cleaning roller 8 is contacted to the charging roller 2 at a contact pressure exceeding 40 mN/mm, the charging roller 2 receives the contact pressure from the cleaning roller 8, so that the charging roller 2 is braked and is not appropriately rotated, and thus there is a possibility that an image defect due to improper charging occurs.

The cleaning roller 8 is rotated in contact with the charging roller 2, so that the cleaning roller 8 is capable of removing at least a part of the deposited matter from the surface of the charging roller 2. In the case where the surface layer of the cleaning roller 8 is the foamed member, the deposited matter can be stored in cells, so that the surface of the charging roller 2 can be cleaned for a longer term.

<Manufacturing Method of Cleaning Roller>

Next, a manufacturing method of the cleaning roller 8 will be described.

First, a polyurethane foam is manufactured. For example, as the polyol, polyether polyol is used. In the polyether polyol, water as the foaming agent, and triethylenediamine, tin octanate and melamine powder which are as the catalyst are mixed, and thereafter, tolylene diisocyanate as the polyisocyanate is added in the mixture, followed by foaming, so that the polyurethane foam is prepared. A resultant polyurethane foam is cut in a plate shape and is perforated with a hole into which the rotation shaft 81 of the cleaning roller 8 is to be inserted. Then, the rotation shaft 81 of the cleaning roller 8 s inserted and fixed in the hole, and a surface (outer peripheral surface, outer surface) thereof is abraded. The cleaning roller 8 may only be required to be thus manufactured.

5. Measuring Method of Time Constant of Charging Roller

The time constant according to the present invention is obtained by the following impedance measurement.

An impedance can be measured by the following method. When the impedance is measured, the following operation is performed in order to eliminate the influence of a contact resistance between the electroconductive member (charging roller 2) and a measuring electrode, an electrically low-resistance thin film is deposited on the surface of the electroconductive member and is used as the electrode, while the electroconductive supporting member 21 is used as a ground electrode, and then the impedance is measured by using these two electrodes as two terminals.

As a forming method of the above-described thin film, it is possible to cite a metal film forming method such as metal deposition, sputtering, coating of metal paste, or application of a metal tape. Of these methods, from a viewpoint of reduction in contact resistance with the electroconductive member, a method in which a metal thin film such as a thin film of platinum or palladium is formed as an electrode by deposition is preferred. In the case where the metal thin film is formed on the surface of the electroconductive member, when simplicity thereof and uniformity of the thin film are taken into account, it is preferable that a mechanism capable of gripping the electroconductive member (charging roller 2) is imparted to a vacuum deposition device, and for the electroconductive member having a cylindrical shape in cross section, a rotating mechanism is further imparted to the vacuum deposition device, and then the vacuum deposition device is used.

For example, for the cylindrical electroconductive member constituted by a curved surface having a circular shape in cross section, it becomes difficult to connect the metal thin film as the above-described measuring electrode and an impedance measuring device, and therefore, the following method may preferably be used. Specifically, measurement may only be required to be made in a manner such that a metal thin film electrode of about 10 mm to 20 mm in width with respect to a longitudinal direction of the electroconductive member is formed, and then a metal sheet is wound about the metal thin film electrode with no gap and is connected to the measuring electrode extended from the measuring device, followed by measurement. By this, an electric signal from the electroconductive layer (elastic layer) 22 of the electroconductive member can be suitably acquired by the measuring device, so that impedance measurement can be carried out. The metal sheet may only be required to be a metal sheet having an electric resistance value which is the same as that of a metal portion of a connecting cable of the measuring device when the impedance is measured, and for example, an aluminum foil, a metal tape, or the like can be used as the metal sheet. The impedance measuring device may only be required to be a device, capable of measuring an impedance in a frequency domain up to $1.0\times10^{7}$ Hz, such as an impedance analyzer, a network analyzer, and a spectral analyzer. Of these devices, in view of an electric resistance region of the electroconductive member, it is preferable that the impedance is measured by the impedance analyzer.

A measuring condition of the impedance will be described. By using the impedance measuring device, the impedance in a frequency domain of $1.0\times10^{-2}$ Hz to $1.0\times10^{7}$ Hz is measured. The measurement is made under an environment of a temperature of 23° C. and a humidity of 50% RH (relative humidity). In order to reduce a variation in measurement, it is preferred that 5 or more measuring points are provided for each frequency. Further, an amplitude of an AC voltage is 1 V. As regards a measurement voltage, measurement may be made while applying a DC voltage by taking a shared voltage applied to the electroconductive member (charging roller 2) in the image forming apparatus 100 into consideration. Specifically, the measurement may be made while applying a DC voltage of 10 V or less and an oscillating voltage in a superimposition manner. This is suitable for quantifying an electric charge transportation and accumulation characteristic.

Next, a time constant calculating method will be described. A measurement result of the impedance measured under the above-described measuring condition is subjected to the following analysis by using, for example, a spread surface software ("Microsoft Excel") (trade name, developed by Microsoft Corp.). Absolute values of imaginary parts acquired by the impedance measurement are plotted relative to measurement frequencies on a double logarithmic graph. A frequency fp [Hz] at which the imaginary part shows a maximum value (local maximum) is calculated, and then a time constant $\tau=\frac{1}{2}\pi fp$ $(=1/(2\pi\times fp))$ [sec] is calculated, so that the time constant according to the present invention can be acquired.

In measurement of the time constant in the cylindrical electroconductive member (charging roller 2), measurement is made at 5 places which are arbitrary places in each of regions when a whole area is equally divided in 5 regions with respect to the longitudinal direction (rotational axis direction of the charging roller 2), and then an arithmetic average of measured values of the time constant at the 5 places may be calculated.

6. Embodiments and Comparison Examples

In the following, the charging roller, the process cartridge, and the image forming apparatus will be specifically described based on specific embodiments, but a technical scope of the present invention is not limited to these embodiments.

First, a manufacturing method of the charging roller 2 in each of embodiments and comparison examples will be described specifically illustratively.

Incidentally, an outline of a constitution of each of charging rollers in embodiments 1 to 5 and comparison examples 1 to 4 described in the following is shown in a table of FIG. 16.

6-1. Embodiment 1

6-1-1. Manufacturing of CR (1)

<Preparation of Unvulcanized Domain Composition>

Ingredients of which kinds and amounts shown in a table 1 below were mixed by a pressure type kneader, and an unvalcanized domain composition (1) was obtained.

TABLE 1

Materials of unvulcanized domain composition (1)

| MATERIAL*1 | NAME*2 | AMOUNT*3 |
|---|---|---|
| RMR | SBR | 100 |
| ECA | CARBON BLACK | 60 |
| VAA | ZINC OXIDE | 5 |
| PA | ZINC STEARATE | 2 |

*1"RMR" is a raw material rubber. "ECA" is an electron-conductive agent. "VAA" is a vulcanization accelerator aid. "PA" is a processing aid.
*2"SBR" is SBR (trade name: "ASAPRENE 303", manufactured by Asahi Kasei Corp.). "CARBON BLACK" is carbon black (trade name: "TOKABLACK #5500", manufactured by Tokai Carbon Co.. Ltd.). "ZINC OXIDE" is zinc oxide (trade name: "ZINC OXIDE" manufactured by Sakai Chemical Industry Co., Ltd.). "ZINC STEARATE" is zinc stearate (trade name: "SZ-2000", manufactured by Sakai Chemical Industry Co., Ltd.).
*3"AMOUNT" is a mixing (compounding) amount (parts by mass).

<Preparation of Unvulcanized Rubber Composition>

Ingredients of which kinds and amounts shown in a table 2 below were mixed by a pressure type kneader, and an unvulcanized rubber composition (1) was obtained.

TABLE 2

Materials of unvulcanized rubber composition (1)

| MATERIAL*1 | NAME*2 | AMOUNT*3 |
|---|---|---|
| RMR | UDC | 25 |
| RMR | NBR | 75 |
| FM | CALCIUM CARBONATE | 40 |
| VAA | ZINC OXIDE | 5 |
| PA | ZINC SEARATE | 2 |

*1"RMR" is the raw material rubber. "FM" is a filler material. "VAA" is the vulcanization accelerator aid. "PA" is the processing aid.
*2"UDC" is the unvulcanized domain composition. "NBR" is NBR (trade name: "JSR NBR N230S", manufactured by JSR Corp.). "CALCIUM CARBONATE" is calcium carbonate (trade name: "NANOX #30", manufactured by Harno Calcium Co., Ltd.). "ZINC OXIDE" is zinc oxide (trade name: "ZINC OXIDE", manufactured by Sakai Chemical Industry Co., Ltd.). "ZINC STEARATE" is zinc stearate (trade name: "SZ-2000", manufactured by Sakai Chemical Industry Co., Ltd.).
*3"AMOUNT" is a mixing amount (parts by mass).

TABLE 3

Materials of elastic layer molding rubber composition (1)

| MATERIAL*1 | NAME*2 | AMOUNT*3 |
|---|---|---|
| RMR | URC(1) | 100 |
| V | DISPERSIVE SULFUR | 3 |

TABLE 3-continued

| Materials of elastic layer molding rubber composition (1) | | |
|---|---|---|
| MATERIAL*1 | NAME*2 | AMOUNT*3 |
| VA (1) | TBTDS(1) | 2 |
| VA (2) | TBTDS(2) | 0.5 |

*1"RMA" is the raw material rubber. "V" is a vulcanizer. "VA (1)" and"VA (2)" are the vulcanization acceleration agents.
*2"URC(1)" is an unvulcanized rubber composition (1). "DISPERSIVE SULFUR" is dispersive sulfur (trade name: "SULFAX200S", sulfur content: 99.5%, manufactured by Tsurumi Chemical Industry Co., Ltd.). "TBTDS(1)" is tetrabenzyl tiurum disulfide (trade name: "Sunceller TBZTD", manufactured by Sanshin Chemical Industry Co., Ltd.). "TBTDS(2)" is tetrabenzyl tiurum disulfide (trade name: "NOCCELER CZ-G", manufactured by Ouchi Shinko Chemical Industrial Co., Ltd.).
*3"AMOUNT" is a mixing amount (parts by mass).

<Molding of Elastic>

A round bar of which is subjected to electroless nickel plating treatment at a free-cutting steel surface thereof and which has a full length of 252 mm and an outer diameter was prepared. Then, by using a roll coater, as an adhesive, "METALOC U-20" (trade name, manufactured by Toyokagaku Kenkyusho Co., Ltd.) was applied over a full circumference of the round rod in a range of 230 mm excluding 11 mm in each of opposite end portions of the round rod. In the embodiment 1, the round rod on which the above-described adhesive was applied was used as the electroconductive supporting member 21.

Next, a die having an inner diameter of 12.5 mm was attached to an end of a cross head extruder including a supplying mechanism of the electroconductive supporting member 21 and a discharging mechanism of an unvulcanized rubber roller. Then, a temperature of the extruder and the crosshead was adjusted to 80° C., and a conveying speed of the electroconductive supporting member (shaft core) 21 was adjusted to 60 mm/sec. Under this condition, the unvulcanized rubber composition (1) was supplied from the extruder, and a periphery of the electroconductive supporting member 21 was coated with the unvulcanized rubber composition (1) in the crosshead, so that an unvulcanized rubber roller (1) was obtained.

Next, the unvulcanized rubber roller 1 was placed in a hot air vulcanizing furnace at 170° C. and was heated for 60 minutes to vulcanize the unvulcanized rubber composition (1), so that a roller in which the elastic layer 22 was formed around the electroconductive supporting member 21 was obtained. Thereafter, each of opposite end portions of the elastic layer 22 was cut by 10 mm, so that a length of a portion provided with the elastic layer 22 with respect to a longitudinal direction was made 232 mm.

Finally, a surface of the elastic layer 22 was abraded by a rotating grindstone. By this, an elastic layer roller (1) of 8.5 mm in diameter at a longitudinal central portion and 8.42 mm in diameter at a position of 90 mm each from the longitudinal central portion toward opposite end portions was obtained.

A charging roller (1) in the embodiment 1 was manufactured by forming a surface layer (1) on the elastic layer roller (1) in the following procedure.

<Preparation of Surface Layer Coating Liquid>

A surface layer coating liquid (1) for forming the surface layer (1) was prepared in the following manner.

In a nitrogen atmosphere, in a reaction container, to 27 parts by mass of polymeric MDI (trade name: "MILLIONATE MR-200", manufactured by Nippon Polyurethane Industry Co., Ltd.), 100 parts by mass of polycarbonate polyol (trade name: "T5652", manufactured by Asahi Kasei: Chemicals Corp.) was gradually added dropwise while keeping a temperature in the reaction container at 65° C. After an end of the dropwise addition, a resultant mixture was reacted for 2 hours at 65° C. A resultant reaction mixture was cooled to room temperature, so that an isocyanate group-ended prepolymer P-1 having an isocyanate group content of 4.3% was obtained.

To 54.9 parts by mass of the isocyanate group-ended prepolymer P-1, 41.52 parts by mass of polycarbonate polyol (trade name: "T5652", manufactured by Asahi Kasei Chemicals Corp.) and 28 parts by mass of carbon black (trade name: "M A 230", manufactured by Mitsubishi Chemical Group Corp., number-average particle size: 30 nm) were added and dissolved in methyl ethyl ketone (MEK) so as to adjust a solid content to 27% by mass. Thus, a mixture (1) was prepared. In a glass bottle having an internal capacity of 450 mL, 270 g of the mixture (1) and 200 g of glass beads having an average diameter of 0.8 mm were placed and were dispersed for 12 hours by using a paint shaker (dispersing machine). After dispersion, to the mixture, 15 parts by mass of urethane particles (trade name: "Dymic beads UCN-5070D", manufactured by Dainichiseika Color & Chemicals Mfg. Co., Ltd.) having an average particle size of 7.0 μm was added. Thereafter, the mixture was further dispersed for 15 minutes and then the glass beads were removed, so that a surface layer coating liquid (1) was obtained.

<Formation of Electroconductive Surface Layer>

The elastic layer roller (1) was dipped (dipping) in the surface layer coating liquid (1) while gripping an upper end portion thereof with respect to a longitudinal direction directed in a vertical direction, and then was pulled up. In this dipping coating, a dipping time was 9 seconds, and a pulling-up speed of the roller was adjusted so that an initial speed become 22 mm/sec and a final speed became 8 mm/see, in which the speed was linearly changed with time between 22 mm/sec and 8 mm/sec. After the coating, the coating liquid was air-dried for 30 minutes at a temperature of 23° C.

Then, in a hot air circulating drier, the air-dried coating liquid was dried for 1 hour at a temperature of 80° C. and then was dried for 1 hour at a temperature of 160° C., so that a dried film of a coating film of the surface layer coating liquid (1) on the elastic roller (1).

Further, a surface of the dried film was irradiated with UV radiation having a wavelength of 254 nm so that an integrated light quantity became 9000 mJ/cm$^2$ and thus a skin layer as an outermost surface of the dried film was removed, so that a surface layer 23 on which surface the electroconductive particles (electroconductive carbon black) in the dried film were exposed. As a light source of the UV radiation, a low-pressure mercury lamp (manufactured by Toshiba Lighting & Technology Corp.) was used. Thus, the charging roller (1) in the embodiment 1 was prepared.

<Measurement of Time Constant>

As pre-treatment, while rotating the charging roller, a measuring electrode was prepared by vapor-depositing platinum on a surface thereof. At this time, an electrode having a width of 1.5 cm and uniform with respect to a circumferential direction was prepared by using a masking tape. By forming this electrode, contribution of a difference in contact area between the measuring electrode and the electroconductive member (charging roller) due to surface roughness of the charging roller can be reduced as small as possible.

Next, an aluminum sheet was wound about the electrode with no gap, and the electrode was connected through the aluminum sheet to the measuring electrode of an impedance measuring device (trade name: "Solartron 1260" and "Solartron 1296", manufactured by Solartron).

Figure 8:
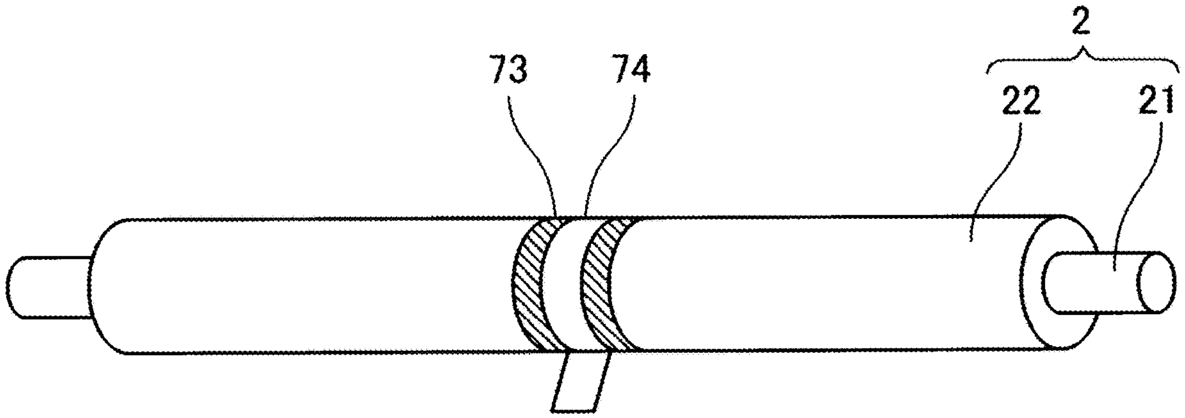
FIG. 8 is a schematic perspective view for illustrating a measuring method of impedance of the charging roller.
Figure 10:
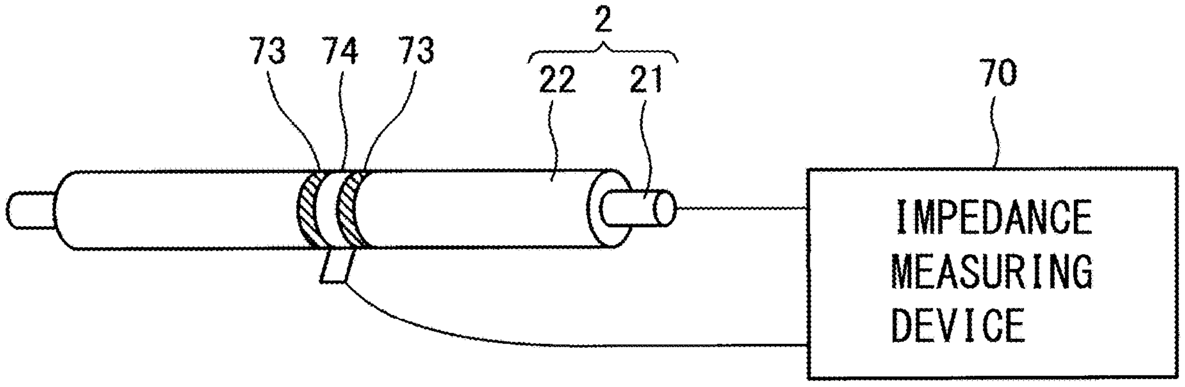
FIG. 10 is a schematic view showing a measuring system of the impedance of the charging roller.

FIG. 8 is a schematic perspective view of the charging roller 2 in a state in which the measuring electrode is formed. Further, FIG. 9 is a schematic sectional view (showing a cross section substantially perpendicular to a rotational axis of the charging roller 2) of the charging roller 2 in the state in which the measuring electrode is formed. Further, FIG. 10 is a schematic diagram of a measuring system.

As shown in FIGS. 8 and 9, on the charging roller 2 including the electroconductive supporting member 21 and the electroconductive layer (elastic layer) 22 having the matrix domain structure, a platinum vapor-deposition layer 73 is formed, and an aluminum sheet 74 is wound about the platinum vapor-deposition layer 73. As shown in FIG. 9, it is important that a state in which the electroconductive layer 22 having the matrix domain structure is sandwiched by the electroconductive supporting member 21 and the platinum vapor-deposition layer (measuring electrode) 73 is formed. Then, as shown in FIG. 10, the aluminum sheet 74 was connected to the measuring electrode on the impedance measuring device ("Solartron 1260" and "Solartron 1296", manufactured by Solartron) side. The electroconductive supporting member 21 and the aluminum sheet 74 are connected to the two electrodes for the measurement, so that the impedance measurement was performed.

Figure 15:
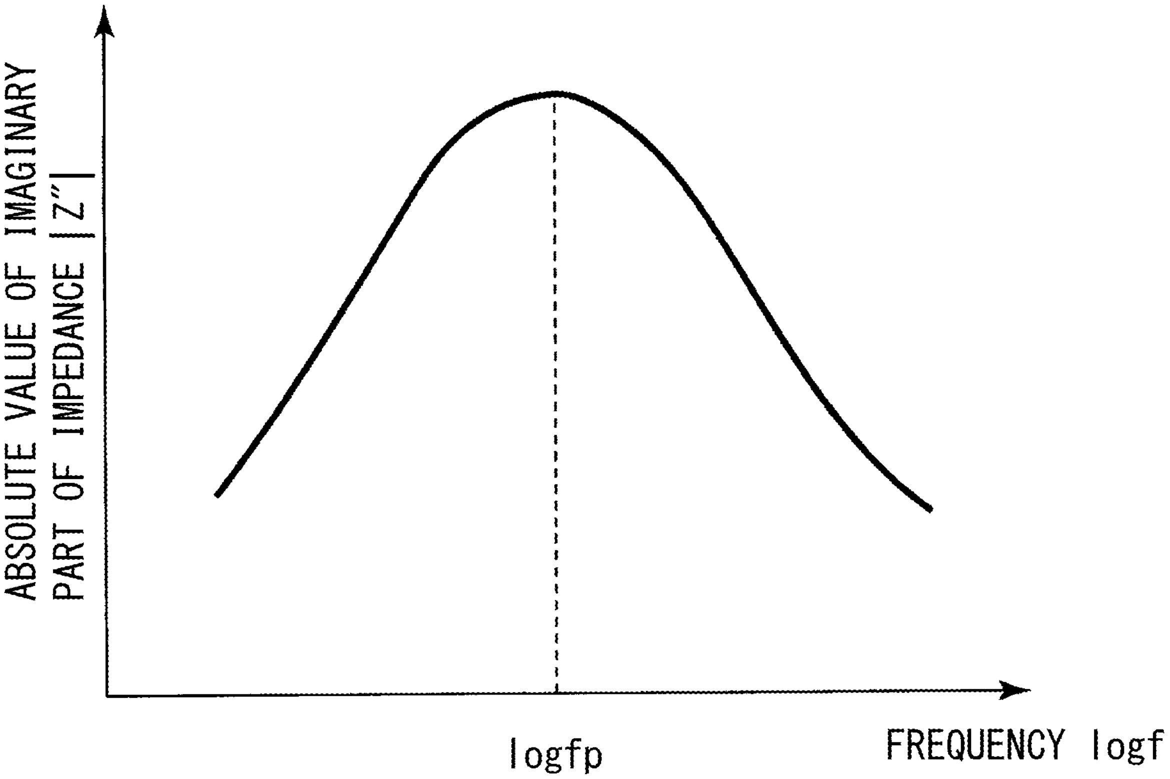
FIG. 15 is a schematic graph for illustrating a calculating method of a time constant of the charging roller.

The measurement of the impedance was made in an environment of a temperature of 23° C. and a relative humidity of 50% RH at an AC voltage of 1 V pp and a frequency of $1.0\times10^{-2}$ Hz to $1.0\times10^{7}$ Hz (every time when the frequency is changed by one digit, measurement was made at 5 points), so that a measuring result of the impedance was obtained. Then, as shown in FIG. 15, by using the measurement result, an absolute value |z"| of an imaginary part obtained by the impedance measurement was plotted relative to a measuring frequency f in a double logarithmic graph. A frequency fp at which the imaginary part show a maximum value is calculated, and then time constant $\tau=\frac{1}{2}\pi fp$ [sec] is calculated, so that the time constant in the present invention was obtained.

In this embodiment, the time constant $\tau$ of the charging roller 2 was 1.20E−3 [sec]. Incidentally, for convenience, "$1.20\times10^{-3}$" is represented by "1.20E−3" in some instances. The same applies to other numerical values of the time constant $\tau$ and a rotation time A described later.

6-1-2. Manufacturing of Charging Roller

As polyols, polyether polyol (trade name: "CARADOL 56-16", manufactured by Shell PLC) obtained by addition polymerization of propylene oxide to glycerin and having an average molecular weight of 3.000 was used. To 100 g of this polyether polyol, 4.0 g of water was a foaming agent, 0.1 g of triethylenediamine as a catalyst, 0.23 g of tin octanoate (stannous octanoate), and 30 g of melamine powder (manufactured by Mitsui Chemicals, Inc.; average particle size: 1 to 10 μm) were added and stirred for 5 minutes by a mixer, and then, 51.3 g of tolylene diisocyanate (trade name: "TDI-80", manufactured by Nippon Polyurethane Industry Co., Ltd.) was added, followed by stirring for 7 seconds, so that a mixture liquid was obtained. "TDI-80" is a mixture of 80% by mass of 2.4-tolylene diisocyanate and 20% by mass of 2,6-tolylenediisocyanate. Further, an isocyanate index was $10^{8}$.

Further, in a polyethylene bag having a size of 30 cm (length) and 30 cm (width), the above mixture was quickly placed, followed by foaming, so that a polyurethane foam was obtained. A content of the melamine powder in the polyurethane foam was 16.5% [=[30/(100+51.3+30]×100].

The resultant polyurethane foam was 400 to 600 μm in average cell diameter based on JIS K 6400 and 50 kg/m$^3$ in density.

After the foaming, the polyethylene bag was peeled off and was cut in a plate-like polymethane foam having a thickness of 18 mm. Then, a hole of 4 mm in diameter was formed as a hole for permitting insertion of the rotation shaft 81 of the cleaning roller 8. On the other hand, a rotation shaft 81 made of steel subjected to electroless nickel plating treatment was prepared, and onto a surface thereof, an ethylene-vinyl acetate-based hot-melt adhesive was applied in a thickness of about 100 μm. This rotation shaft 81 was inserted into the hole of the polyurethane foam and was induction-heated, so that the rotation shaft 81 was fixed in the polyurethane foam. Then, a surface of the polyurethane foam was abraded, so that a cleaning roller 8 of 6 mm in outer diameter was prepared. In the embodiment 1, the cleaning roller 8 had a constitution in which the cleaning roller 8 was contacted to the charging roller 2 (the above-described charging roller (1)) at a contact pressure of 20 mN/mm and was rotated with rotation of the charging roller 2 (the charging roller (1)).

6-1-3. Shaft-Supporting Constitution of Cleaning Roller and Charging Roller

Figure 11:
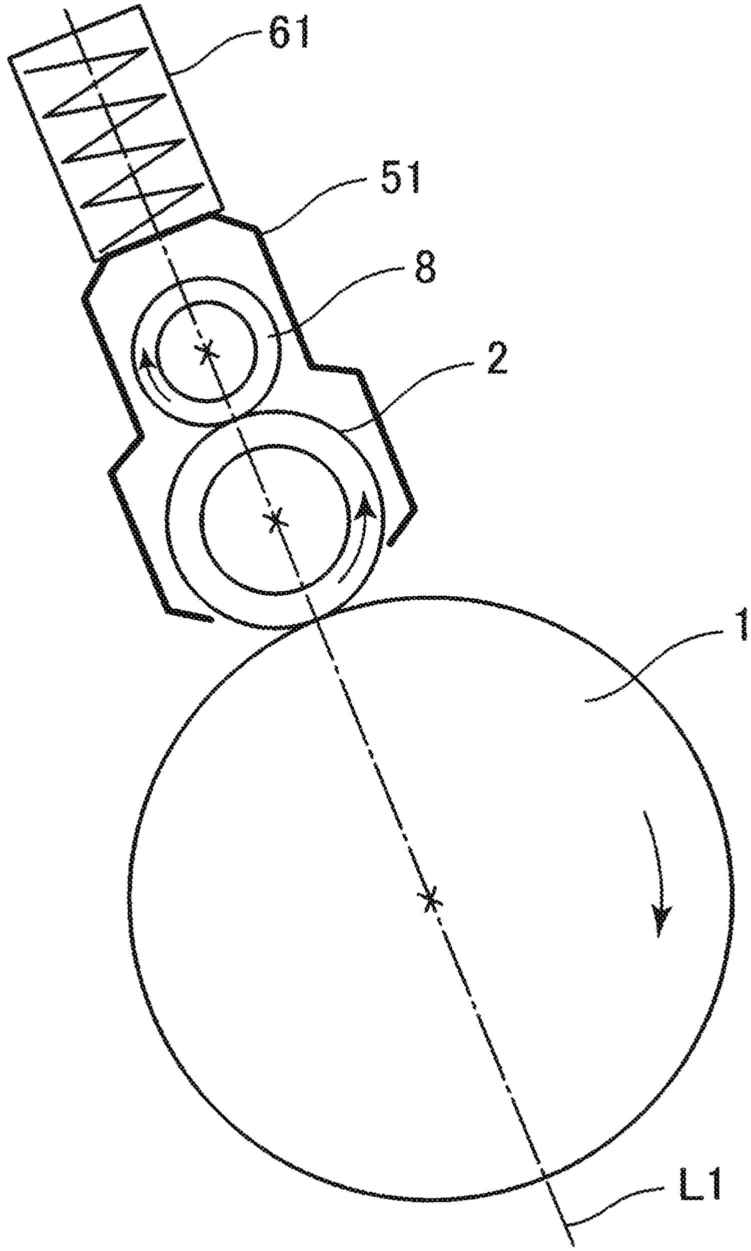
FIG. 11 is a schematic sectional view for illustrating an example of a shaft supporting constitution for the charging roller and a driving roller.

FIG. 11 is a schematic sectional view showing a shaft-supporting constitution of the charging roller 2 and the cleaning roller 8 in the embodiment 1 (which shows a across section substantially perpendicular to the rotational axis of the charging roller 2). Incidentally, although FIG. 11 shows the constitution on one end portion side with respect to a rotational axis direction of the charging roller 2, the constitution on the other end portion side is also the same (i.e., the constitutions on these sides are substantially symmetrical to each other with respect to a flat plane passing through a center with respect to the rotational axis direction of the charging roller 2).

In the embodiment 1, as shown in FIG. 11, each of the rotation shaft (opposite end portions of the supporting member 21 of the charging roller 2 and the rotation shaft (opposite end portions of the rotation shaft 81) of the cleaning roller 8 is rotatably supported by a bearing member 51 in a fixing position so that an interval between these rotation shafts becomes constant. The bearing member 51 is supported slidably and movably by the cleaning container 9. Between the bearing member 51 and the cleaning container 9, a pressing spring 61 which is an urging member as an urging means is provided. The pressing spring 61 urges the bearing member 51 in a direction toward a rotation center of the photosensitive drum 1, i.e., along a rectilinear line L1 (substantially parallel to L1 in this embodiment). For this reason, the charging roller 2 is pressed toward the photosensitive drum 1 and is contacted to the photosensitive drum 1.

6-1-4. Contact Position Between Cleaning Roller and Charging Roller

In the embodiment 1, as shown in FIG. 11, a contact position between the cleaning roller 8 and the charging roller 2 was disposed in a position on the rectilinear line L1 passing through the rotation center of the photosensitive drum 1 and a rotation center of the charging roller 2. Incidentally, the contact position between the cleaning roller 8 and the charging roller 2 is represented by an intermediary position with respect to a surface movement direction of the charging roller 2.

6-1-5. Measuring Method of a Rotation Time of Charging Roller

A time in which the charging roller 2 is rotated from contact of a certain point of the surface of the charging roller 2 with the cleaning roller 8 to contact of the certain point with the cleaning roller 8 again was the rotation time A [sec].

The rotation time A was calculated by the following method. First, in a contact point between the cleaning roller 8 and the charging roller 2, marking is made on the surface of the charging roller 2 with an oil-based pen. Then, the charging roller 2 is rotated by hand rotation of the photosensitive drum 1 with the marking portion of the charging roller 2 contacts the cleaning roller 8 again. Further, the rotation time A [sec] is calculated on the basis of a number of rotations (how many times of rotations) of the charging roller 2 until the marking portion contacts the cleaning roller 8 again, a diameter (outer diameter) of the charging roller 2, and a process speed (surface movement speed of the charging roller 2 during the charging).

In the embodiment 1, the rotation time A was 0.116 [sec].

As regards the embodiment 1, an image evaluation 1 and an image evaluation 2 which are described later were performed.

6-2. Comparison Example 1

As the charging roller 2, a charging roller (3) manufactured by the following manufacturing method was used. Other constitutions were similar to those in the embodiment 1.

As regards the comparison example 1, similarly as in the embodiment 1, the image evaluation 1 and the image evaluation 2 which are described later were performed.

As described later, in the comparison example 1, the time constant of the charging roller 2 was large, and a lowering in absolute value of a surface potential was conspicuous, and therefore, a charging lateral stripe image generated.

The charging roller (3) in the comparison example 1 was manufactured by changing the unvulcanized rubber composition (1) and the elastic layer molding rubber composition (1) of the charging roller (1) in the embodiment 1 to an unvulcanized rubber composition (3) and an elastic layer molding rubber composition (3), respectively, described below and by subjecting the compositions to UV treatment without forming the surface layer 23. The charging roller (3) was manufactured under the same condition as that for the charging roller (1) in the embodiment 1 except for the above-described condition.

TABLE 4

Materials of unvulcanized rubber composition (3)

| MATERIAL*1 | NAME*2 | AMOUNT*3 |
|---|---|---|
| RMR | NBR | 100 |
| ECA | CARBON BLACK | 45 |
| FM | CALCIUM CARBONATE | 40 |
| VAA | ZINC OXIDE | 5 |
| PA | ZINC SEARATE | 2 |

*1"RMR" is the raw material rubber. "FM" is a filler material. "VAA" is the vulcanization accelerator aid. "PA" is the processing aid.
*2"NBR" is NBR (trade name: "JSR NBR N230S", manufactured by JSR Corp.). "CARBON BLACK" is carbon black (trade name: "TOKABLACK #5500", manufactured by Tokai Carbon Co., Ltd.). "CALCIUM CARBONATE" is calcium carbonate (trade name: "NANOX # 30", manufactured by Harno Calcium Co., Ltd.). "ZINC OXIDE" is zinc oxide (trade name: "ZINC OXIDE", manufactured by Sakai Chemical Industry Co., Ltd.). "ZINC STEARATE" is zinc stearate (trade name: "SZ-2000", manufactured by Sakai Chemical Industry Co., Ltd.).
*3"AMOUNT" is a mixing amount (parts by mass).

TABLE 5

Materials of elastic layer molding rubber composition (3)

| MATERIAL*1 | NAME*2 | AMOUNT*3 |
|---|---|---|
| RMR | URC(3) | 100 |
| V | DISPERSIVE SULFUR | 3 |
| VA (1) | TBTDS | 2 |
| VA (2) | NTBBTSI | 0.5 |

*1"RMA" is the raw material rubber. "V" is a vulcanizer. "VA (1)" and"VA (2)" are the vulcanization acceleration agents.
*2"URC(1)" is an unvulcanized rubber composition (1). "DISPERSIVE SULFUR" is dispersive sulfur (trade name: "SULFAX 200S", sulfur content: 99.5%, manufactured by Tsurumi Chemical Industry Co., Ltd.). "TBTDS" is tetrabenzyl tiurum disulfide (trade name: "Sunceller TBZTD", manufactured by Sanshin Chemical Industry Co., Ltd.). "NTBBTSI" is N-t-butyl-2-benzothiazole sulfenimide (trade name: "SANTOCURE-TBSI", manufactured by FLEX SY S.
*3"AMOUNT" is a mixing amount (parts by mass).

6-3. Comparison Example 2

As the charging roller 2, a charging roller (4) manufactured by the following manufacturing method was used. Other constitutions were similar to those in the embodiment 1.

As regards the comparison example 2, similarly as in the embodiment 1, the image evaluation 1 and the image evaluation 2 which are described later were performed.

As described later, in the comparison example 2, the time constant of the charging roller 2 was smaller than that in the comparison example 1, but was larger than that in the embodiment 1, and in the image evaluation 2, the charging lateral stripe image generated.

The charging roller (4) in the comparison example 2 was manufactured by changing an unvulcanized rubber composition (2) and an elastic layer molding rubber composition (2) of a charging roller (2) in an embodiment 2 described later to an unvulcanized rubber composition (4) and an elastic layer molding rubber composition (4), respectively, described below. The charging roller (4) was manufactured under the same condition as that for the charging roller (2) in the embodiment 2 except for the above-described condition. In the comparison example 2, similarly as in the embodiment 2, the surface layer 23 was prepared by using a surface layer coating liquid (2) described later.

TABLE 6

Materials of unvulcanized rubber composition (4)

| MATERIAL*1 | NAME* | AMOUNT*3 |
|---|---|---|
| RMR | EHR | 100 |
| ICA | QAS | 3 |
| FM | CALCIUM CARBONATE | 60 |
| P | APBP | 10 |
| VAA | ZINC OXIDE | 5 |
| PA | ZINC SEARATE | 1 |

*1"RMR" is the raw material rubber. "ICA" is the ion-conductive agent. "FM" is a filler material. "P" is a plasticizer. "VAA" is the vulcanization accelerator aid. "PA" is the processing aid.
*2"EHR" is epichlorohydrin rubber (EO-EP-AGE tertiary compound) (trade name: "EPION ON301", manufactured by Osaka Soda). "QAS" is a quaternary ammonium salt (trade name: "ADEKA CIZER LV70", manufactured by ADEKA Corp.). "CALCIUM CARBONATE" is calcium carbonate (trade name: "NANOX #30", manufactured by Harno Calcium Co., Ltd.). "APBP" is aliphatic polestar-based plasticizer (trade name: Polycizer P-202, manufactured by DIC Corp.). "ZINC OXIDE" is zinc oxide (trade name: "ZINC OXIDE", manufactured by Sakai Chemical Industry Co., Ltd.). "ZINC STEARATE" is zinc stearate (trade name: "SZ-2000", manufactured by Sakai Chemical Industry Co., Ltd.).
*3"AMOUNT" is a mixing amount (parts by mass).

TABLE 7

| Materials of elastic layer molding rubber composition (4) | | |
|---|---|---|
| MATERIAL*1 | NAME*2 | AMOUNT*3 |
| RMR | URC(1) | 100 |
| V | DISPERSIVE SULFUR | 1.8 |
| VA (1) | TMTMS | 1 |
| VA (2) | DBTS | 1 |

*1"RMA" is the raw material rubber. "V" is a vulcanizer. "VA (1)" and "VA (2)" are the vulcanization acceleration agents.
*2"URC(1)" is an unvulcanized rubber composition (1). "DISPERSIVE SULFUR" is dispersive sulfur (trade name: "SULFAX 200S", manufactured by Tsurumi Chemical Industry Co., Ltd.). "TMTMS" is tetramethyl tiurum monosulfide (trade name: "NOCCELER TS", manufactured by Ouchi Shinko Chemical Industrial Co., Ltd.). "DBTS" is dibenzothiazylsulfide (trade name: "NOCCELER DM", manufactured by Ouchi Shinko Chemical Industrial Co., Ltd.).
*3"AMOUNT" is a mixing amount (parts by mass).

6-4. Comparison Example 3

As the charging roller 2, a charging roller (5) manufactured by the following manufacturing method was used. Other constitutions were similar to those in the embodiment 1.

As regards the comparison example 3, similarly as in the embodiment 1, the image evaluation 1 and the image evaluation 2 which are described later were performed.

As described later, in the comparison example 1, the time constant of the charging roller 2 was large, and a lowering in absolute value of a surface potential was conspicuous, and therefore, a charging lateral stripe image generated.

In the comparison example 3, for manufacturing the charging roller (5), a surface layer coating liquid (3) prepared by changing the parts by mass of carbon black (trade name: MA 230", manufactured by Mitsubishi Chemical Group Corp., number-average particle size: 30 nm) added for preparing the surface layer coating liquid (2) in the comparison example 2 to 50 parts by mass was used. The charging roller (5) was manufactured under the same condition as that for the charging roller (4) except for the above-described condition.

6-5. Comparison Example 4

A comparison example 4 is the same as the comparison example 2 except for the following constitution.

As regards the comparison example 4, similarly as in the embodiment 1, the image evaluation 1 and the image evaluation 2 which are described later were performed.

In the comparison example 4, a constitution in which a gear is attached to each of the charging roller 2 and the photosensitive drum 1 and in which the charging roller 2 is rotationally driven at a desired peripheral speed by receiving a force from the gear of the photosensitive drum 1 by the gear of the charging roller 2 was employed.

Further, in the comparison example 4, the peripheral speed of the charging roller 2 was made slower than a peripheral speed of the photosensitive drum 1 so as to satisfy $A/\tau \geq 60$.

In the comparison example 4, the rotation time was 0.160 [sec].

6-6. Embodiment 2

As the charging roller 2, the charging roller (2) manufactured by the following manufacturing method was used. Other constitutions were similar to those in the embodiment 1.

As regards the embodiment 2, similarly as in the embodiment 1, the image evaluation 1 and the image evaluation 2 which are described later were performed, and in addition, an image evaluation 3 described later was performed.

The charging roller (2) in the embodiment 2 was manufactured in a procedure described later by changing the unvulcanized domain composition (1), the unvulcanized rubber composition (1) and the elastic layer molding rubber composition (1) of the charging roller (1) in the embodiment 1 to an unvulcanized domain composition (2), an unvulcanized rubber composition (2) and an elastic layer molding rubber composition (2), respectively, described below and by changing the surface layer coating liquid (1) of the charging roller (1) in the embodiment 1 to the surface layer coating liquid (2) described later. The charging roller (2) was manufactured under the same condition as that for the charging roller (1) in the embodiment 1 except for the above-described condition.

TABLE 8

| Materials of unvulcanized domain composition (2) | | |
|---|---|---|
| MATERIAL*1 | NAME*2 | AMOUNT*3 |
| RMR | NBR | 100 |
| ECA | CARBON BLACK | 60 |
| VAA | ZINC OXIDE | 5 |
| PA | ZINC STEARATE | 2 |

*1"RMR" is a raw material rubber. "ECA" is an electron-conductive agent. "VAA" is a vulcanization accelerator aid. "PA" is a processing aid.
*2"NBR" is NBR (trade name: "JSR NBR N230S", manufactured by JSR Corp.). "CARBON BLACK" is carbon black (trade name: "TOKABLACK #5500", manufactured by Tokai Carbon Co.. Ltd.). "ZINC OXIDE" is zinc oxide (trade name: "ZINC OXIDE" manufactured by Sakai Chemical Industry Co., Ltd.). "ZINC STEARATE" is zinc stearate (trade name: "SZ-2000", manufactured by Sakai Chemical Industry Co., Ltd.).
*3"AMOUNT" is a mixing (compounding) amount (parts by mass).

TABLE 9

| Materials of unvulcanized rubber composition (2) | | |
|---|---|---|
| MATERIAL*1 | NAME*2 | AMOUNT*3 |
| RMR | UDC(2) | 30 |
| RMR | SBR | 70 |
| FM | CALCIUM CARBONATE | 40 |
| VAA | ZINC OXIDE | 5 |
| PA | ZINC SEARATE | 2 |

*1"RMR" is the raw material rubber. "FM" is a filler material. "VAA" is the vulcanization accelerator aid. "PA" is the processing aid.
*2"UDC(2)" is the unvulcanized domain composition (2). "SBR" is SBR (trade name: "ASAPRENE 303", manufactured by Asahi Kasei Corp.). "CALCIUM CARBONATE" is calcium carbonate (trade name: "NANOX #30" manufactured by Harno Calcium Co., Ltd.). "ZINC OXIDE" is zinc oxide (trade name: "ZINC OXIDE", manufactured by Sakai Chemical Industry Co., Ltd.). "ZINC STEARATE" is zinc stearate (trade name: "SZ-2000", manufactured by Sakai Chemical Industry Co., Ltd.).
*3"AMOUNT" is a mixing amount (parts by mass).

TABLE 10

| Materials of elastic layer molding rubber composition (2) | | |
|---|---|---|
| MATERIAL*1 | NAME*2 | AMOUNT*3 |
| RMR | URC(2) | 100 |
| V | DISPERSIVE SULFUR | 3 |

TABLE 10-continued

| Materials of elastic layer molding rubber composition (2) | | |
|---|---|---|
| MATERIAL*1 | NAME*2 | AMOUNT*3 |
| VA (1) | TBTDS(1) | 2 |
| VA (2) | TBTDS(2) | 0.5 |

*1"RMA" is the raw material rubber. "V" is a vulcanizer. "VA (1)" and "VA (2)" are the vulcanization acceleration agents.
*2"URC(2)" is an unvulcanized rubber composition (2). "DISPERSIVE SULFUR" is dispersive sulfur (trade name: "SULFAX 200S", sulfur content: 99.5%, manufactured by Tsurumi Chemical Industry Co., Ltd.). "TBTDS(1)" is tetrabenzyl tiurum disulfide (trade name: "Sunceller TBZTD", manufactured by Sanshin Chemical Industry Co., Ltd.). "TBTDS(2)" is tetrabenzyl tiurum disulfide (trade name: "NOCCELER CZ-G", manufactured by Ouchi Shinko Chemical Industrial Co., Ltd.).
*3"AMOUNT" is a mixing amount (parts by mass).

The surface layer coating liquid (2) for forming the surface layer (2) was prepared in the following manner.

100 parts by mass of acryl polyol (trade name: "DC2016", manufactured by Daicel Corp.), 14 parts by mass is isocyanate A (trade name: "VESTANAT B 1370", manufactured by Degussa), 80 parts by mass of isocyanate B (trade name: "DURANATE TPA-880E", manufactured by Asahi Kasei Chemicals Corp.), 35 parts by mass of carbon black (trade name: "MA 230", manufactured by Mitsubishi Chemical Group Corp., number-average particle size: 30 nm), and 0.25 parts by mass of ether-modified dimethyl silicone oil (trade name: "SH-28PA", manufactured by Dow Toray Co., Ltd.) were dissolved in methyl ethyl ketone (MEK) so as to adjust a solid content to 25% by mass. Thus, a mixture (2) was prepared. In a glass bottle having an internal capacity of 450 mL, 270 g of the mixture (2) and 200 g of glass beads having an average diameter of 0.8 mm were placed and were dispersed for 24 hours by using a paint shaker (dispersing machine). After dispersion, to the mixture, 30 parts by mass of acrylic particles (trade name: "GENZPEARL GM-1001", manufactured by Aica Kogyo Co., Ltd.) having an average particle size of 10.0 μm was added. Thereafter, the mixture was further dispersed for 25 minutes and then the glass beads were removed, so that a surface layer coating liquid (2) was obtained.

The elastic layer roller (2) was dipped (dipping) in the surface layer coating liquid (2) while gripping an upper end portion thereof with respect to a longitudinal direction directed in a vertical direction, and then was pulled up. In this dipping coating, a dipping time was 9 seconds, and a pulling-up speed of the roller was adjusted so that an initial speed become 20 mm/sec and a final speed became 12 mm/sec, in which the speed was linearly changed with time between 20 mm/sec and 12 mm/sec. After the coating, the coating liquid was air-dried for 30 minutes at a temperature of 23° C.

Then, in a hot air circulating drier, the air-dried coating liquid was dried for 1 hour at a temperature of 80° C. and then was dried for 1 hour at a temperature of 160° C., so that a dried film of a coating film of the surface layer coating liquid (2) on the elastic roller for the charging roller (2), so that the charging roller (2) in the embodiment 2 was prepared.

6-7. Embodiment 3

In an embodiment 3, a roller formed by winding a sponge sheet helically about a rotation shaft made of metal (herein, this roller is also referred to as a "helical roller") was used as the cleaning roller 8. Other constitutions are similar to those of the embodiment 2.

As regards the embodiment 3, similarly as the embodiment 2, the image evaluation 1, the image example 2, and the image evaluation 3 which are described later were performed.

Figure 12:
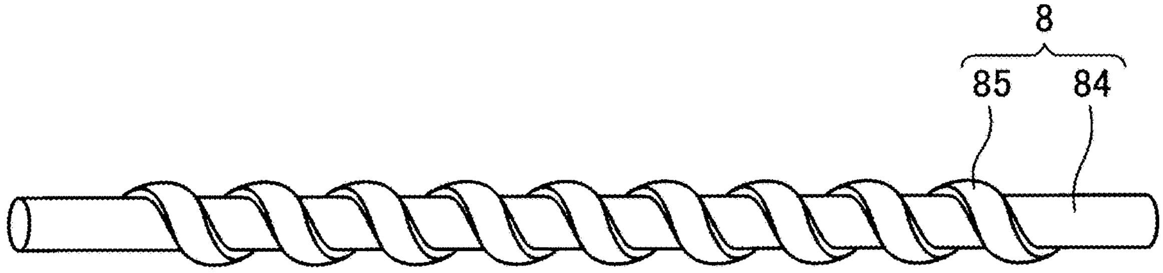
FIG. 12 is a schematic perspective view of another example of the cleaning roller.

FIG. 12 is a schematic side view of the cleaning roller 8 used in the embodiment 3. As shown in FIG. 12, this cleaning roller 8 includes a rotation shaft (core metal) 84 made of metal and a foamed elastic layer formed by a sponge sheet 85 wound helically about the rotation shaft 84. The cleaning roller 8 includes the sponge sheet 85 as a cleaning portion contacting a roller portion (elastic layer 22) of the charging roller 2 and the rotation shaft 84 as a non-cleaning portion not contacting the roller portion. That is, the cleaning roller 8 is formed by helically winding the cleaning portion around the non-cleaning portion. The cleaning roller 8 is constituted so that the cleaning portion thereof and the non-cleaning portion thereof alternately oppose a certain point of the surface of the charging roller 2 with respect to the rotational axis direction of the charging roller 2.

In the embodiment 3, the rotation time A was 0.232 [sec].

6-8. Embodiment 4

An embodiment 4 is different from the embodiment 2 in contact position between the cleaning roller 8 and the charging roller 2. Other constitutions of the embodiment 4 are the same as those of the embodiment 3.

Figure 13:
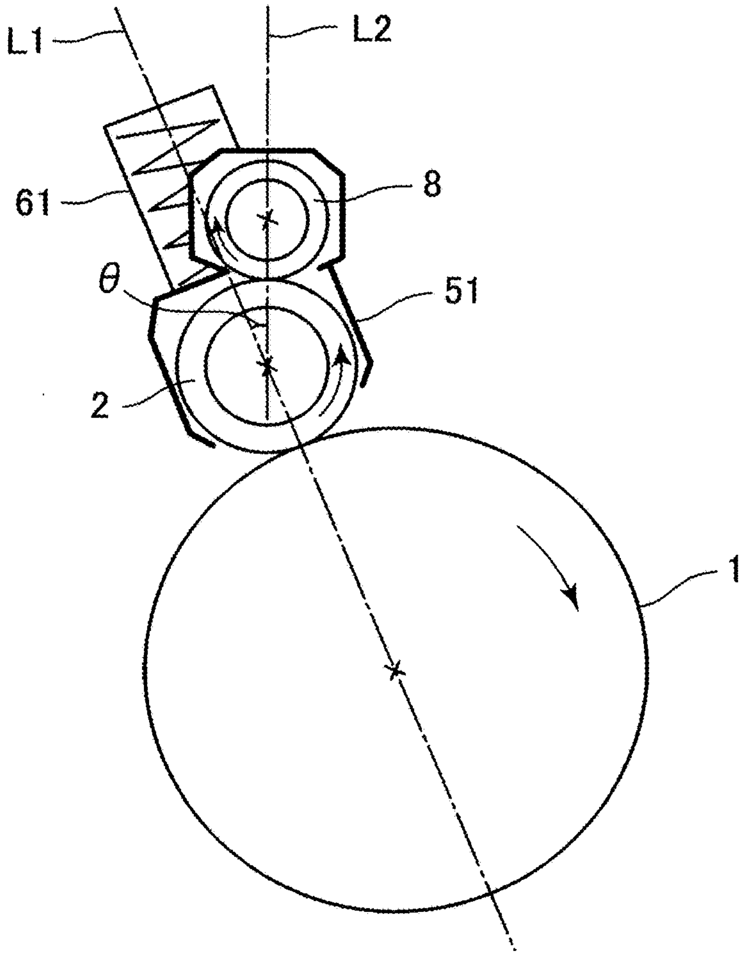
FIG. 13 is a schematic sectional view for illustrating another example of the shaft supporting constitution for the charging roller and the driving roller.

FIG. 13 is a schematic sectional view (showing a cross section substantially perpendicular to the rotational axis of the charging roller 2) showing a shaft supporting constitution of the charging roller 2 and the cleaning roller 8 in the embodiment 4. Incidentally, FIG. 13 shows a constitution on one end portion side with respect to the rotational axis direction of the charging roller 2, but a constitution on the other end portion side is the same as the constitution on the one end portion side (i.e., these constitutions are substantially symmetrical with respect to a flat plane passing through a center with respect to the rotational axis direction of the charging roller 2).

In the embodiment 4, as shown in FIG. 13, a rotation shaft (opposite end portions of the supporting member 21) of the charging roller 2 and a rotation shaft (opposite end portions of the rotation shaft 84) of the cleaning roller 8 are rotatably supported by a bearing member 51 in fixing positions so that an interval between these rotation shafts becomes constant. The bearing member 51 is supported slidably and movably by the cleaning container 9. Between the bearing member 51 and the cleaning container 9, the pressing spring 61 which is an urging member as an urging means is provided. The pressing spring 61 urges the bearing member 51 in a direction toward the rotation center of the photosensitive drum 1, i.e., along (in this embodiment, substantially parallel to) the rectilinear line L1. For this reason, the charging roller 2 is pressed and contacted to the photosensitive drum 1.

Further, as shown in FIG. 13, the rectilinear line passing through the rotation center of the photosensitive drum 1 and the rotation center of the charging roller 2 is the rectilinear line L1, and a rectilinear line passing through the rotation center of the charging roller 2 and the rotation center of the cleaning roller 8 is a rectilinear line L2. At this time, in the embodiment 4, the cleaning roller 8 was disposed so that the rectilinear line L2 is inclined relative to the rectilinear line L1 by 21° (angle θ) in a direction opposite to the rotational direction of the charging roller 2. The contact position between the cleaning roller 8 and the charging roller 2 is disposed on the rectilinear line L2. Thus, in the embodiment 4, on the basis of the rotation center of the charging roller 2, the cleaning roller 8 is disposed so that the rectilinear line L2 is positioned on a side upstream of the rectilinear line L1 with respect to the rotational direction of the charging roller 2 and downstream of the contact position between the charging roller 2 and the photosensitive drum 1 with respect to the rotational direction of the charging roller 2.

As regards the embodiment 4, similarly as the embodiment 3, the image evaluation 1, the image evaluation 2, and the image evaluation 3 which are described later were performed.

6-9. Embodiment 5

An embodiment 5 is different from the embodiment 4 in urging method of cleaning roller 8 toward the charging roller 2. Other constitutions of the embodiment 5 are the same as those of the embodiment 4.

Figure 14:
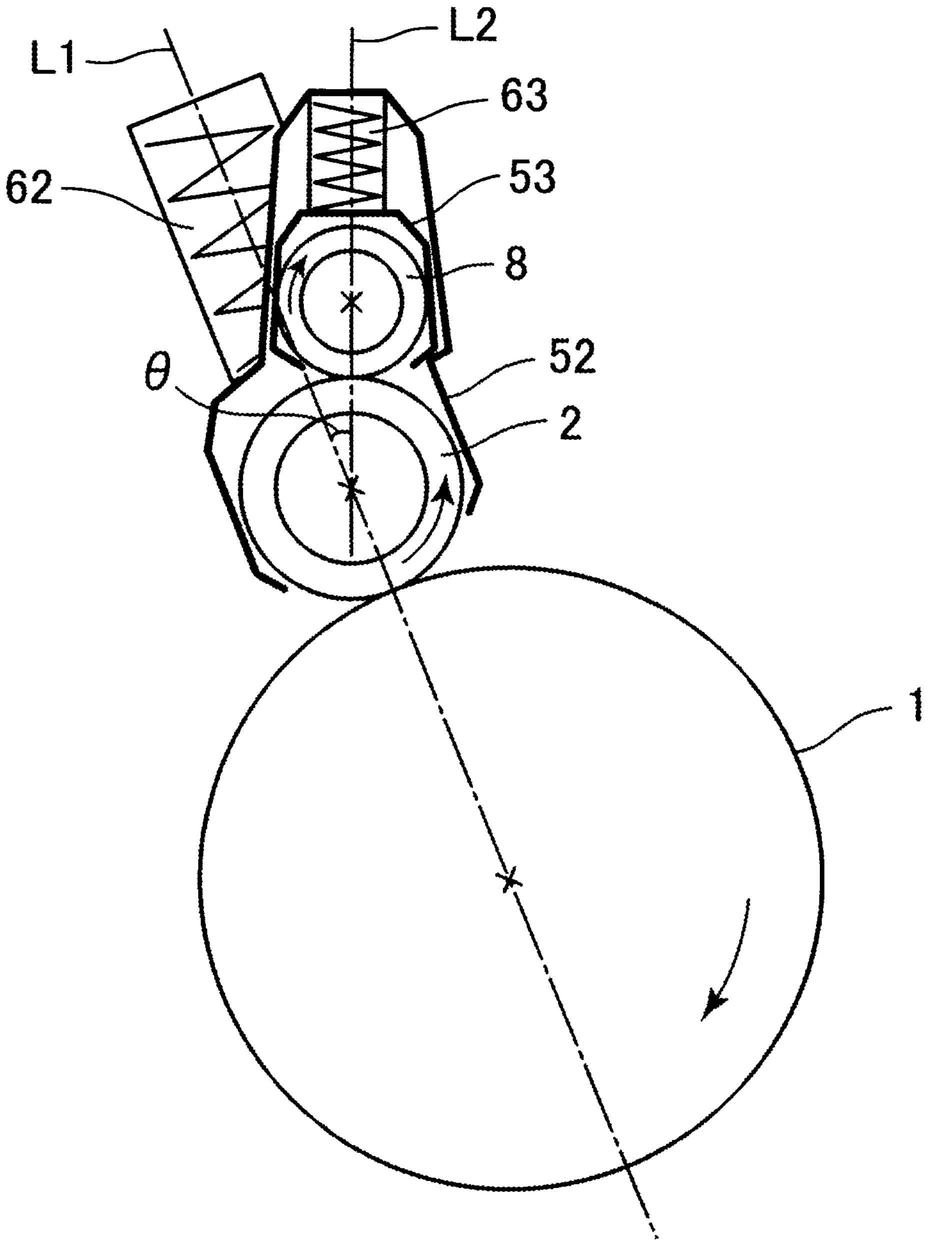
FIG. 14 is a schematic sectional view for illustrating a further example of the shaft supporting constitution for the charging roller and the driving roller.

FIG. 14 is a schematic sectional view (showing a cross section substantially perpendicular to the rotational axis of the charging roller 2) showing a shaft supporting constitution of the charging roller 2 and the cleaning roller 8 in the embodiment 5. Incidentally, FIG. 14 shows a constitution on one end portion side with respect to the rotational axis direction of the charging roller 2, but a constitution on the other end portion side is the same as the constitution on the one end portion side (i.e., these constitutions are substantially symmetrical with respect to a flat plane passing through a center with respect to the rotational axis direction of the charging roller 2).

In the embodiment 5, as shown in FIG. 14, a rotation shaft (opposite end portions of the supporting member 21) of the charging roller 2 is rotatably supported by a charging roller bearing member (first bearing member) 52. The charging roller bearing member 52 is supported slidably and movably by the cleaning container 9, and between the charging roller bearing member 52 and the cleaning container 9, a charging roller pressing spring 62 which is a first urging member as an urging means is provided. The charging roller pressing spring 62 urges the charging roller bearing member 52 in a direction toward the rotation center of the photosensitive drum 1, i.e., along (in this embodiment, substantially parallel to) the rectilinear line L1. For this reason, the charging roller 2 is pressed and contacted to the photosensitive drum 1.

On the other hand, in the embodiment 5, as shown in FIG. 14, the cleaning roller 8 is contacted by a cleaning roller pressing spring 63 to the surface of the charging roller 2 by a predetermined pressing force, and is rotated with the rotation of the charging roller 2. That is, the rotation shaft (opposite end portions of the rotation shaft 84) of the cleaning roller 8 is rotatably supported by a cleaning roller bearing member (second bearing member) 53. The cleaning roller bearing member 53 is slidably and movably supported by the charging roller bearing member 52. Between the cleaning roller bearing member 53 and the charging roller bearing member 52, the cleaning roller pressing spring 63 which is a second urging member as an urging means is provided. The cleaning roller bearing member 53 is movably supported by the charging roller bearing member 52 through the cleaning roller pressing spring 63. The cleaning roller pressing spring 63 urges the cleaning roller bearing member 53 in a direction toward the rotation center of the charging roller 2, i.e., along (in this embodiment, substantially parallel to) the rectilinear line L2. For this reason, the cleaning roller 8 is pressed and contacted to the charging roller 2.

Thus, the cleaning roller 8 is urged against the charging roller 2 by the cleaning roller pressing spring 63, so that a pressing force of the cleaning roller 8 against the charging roller 2 is readily stabilized. For that reason, for example, even in the case where hardness of a sponge portion of the cleaning roller 8 is increased by continuously collecting the toner, the pressing force of the cleaning roller 8 against the charging roller 2 is not readily increased relatively.

Further, the cleaning roller pressing spring 63 and the charging roller pressing spring 62 are disposed with an angle (angle between the rectilinear line L1 and the rectilinear line L2). This is because even in the case where the contact position between the charging roller 2 and the cleaning roller 8 is shifted from the rectilinear line L1 and is disposed, each of an urging direction of the cleaning roller 8 and an urging direction of the charging roller 2 is independently set in a predetermined direction.

Incidentally, in this embodiment, in the cross section substantially perpendicular to the rotational axis of the charging roller 2, the urging direction of the cleaning roller 8 is a direction toward the rotation center of the charging roller 2, and the urging direction of the charging roller 2 is a direction toward the rotation center of the photosensitive drum 1.

7. Evaluation Method

In order to evaluate the charging lateral stripe image, the following evaluation test was conducted. An evaluation result is shown in FIG. 17.

<Test Device>

As an electrophotographic image forming apparatus, a laser printer (trade name: "Laser Jet Pro 4003dw", manufactured by HP Inc.) of an electrophotographic type according to the present invention. Incidentally, in order to perform evaluation in a high-speed process, the laser printer was modified so that a number of output sheets per minute becomes 47 sheets/minute for A 4-size sheets, which is larger than an original number of output sheets per minute. An output speed of the recording material at that time was 230 mm/sec. Further, in order to perform the evaluations for the respective embodiments and the respective comparison examples, an apparatus main assembly and a process cartridge of the laser printer were appropriately modified and used. Each of the charging rollers in the embodiments 1 to 5 and the comparison examples 1 to 4 was mounted to the process cartridge, and then the following image evaluations were performed.

Image Evaluation 1

As the image evaluation 1, the following evaluation test was conducted.

The charging roller, the laser printer, and the process cartridge were left standing for 48 hours in an environment of 32.5° C./80% RH for the purpose of being accustomed to an evaluation environment.

The charging roller left standing in the above-described environment was set as the charging roller of the process cartridge left standing in the above-described environment and was assembled into the laser printer left standing in the above-described environment. Thereafter, in the same environment, output of images was continuously carried on an 12,000 sheets in total.

As the image outputted, an alphabet character "E" of 4 point in size was formed on A 4-size paper so as to provide a print ratio of 1.0%. A charging bias was-1040 V, a dark-portion potential VD was-530 V (VD reference value), and a light-portion potential was-100 V.

Thereafter, a half-tone image (a lateral (horizontal) line of 1 dot in width and 2 dots in interval with respect to a direction substantially perpendicular to a surface movement direction of the photosensitive drum) was outputted. This half-tone image was visually observed, so that the charging lateral stripe image was evaluated based on the following evaluation criteria.

(Evaluation of Charging Lateral Stripe Image on Half-Tone Image)

Rank A: Even when the half-tone image was observed, no charging lateral stripe image was observed on the half-tone image.

Rank B: The charging lateral stripe image was not observed by the visual observation, but when the half-tone image was observed through a microscope, disorder of the dots was obtained.

Rank C: The charging lateral stripe image was observed on a part of the half-tone image.

Rank D: The charging lateral stripe image was observed on a whole surface of the half-tone image.

Image Evaluation 2

In the image evaluation 2, the laser printer was modified so that the number of output sheets became 75 sheets/minute for A 4-size paper. An output speed of the recording materials at that time was 370 mm/sec. The image evaluation 2 was made similarly as in the image evaluation 2 except for the above condition.

Image Evaluation 3

In the image evaluation 3, the following operation was conducted subsequently to the above-described evaluation 2.

In the same environment, output of images was further continuously carried on an 30,000 sheets in total.

As the image outputted, the alphabet character “E” of 4 point in size was formed on A 4-size paper so as to provide the print ratio of 1.0%.

Thereafter, the half-tone image (the lateral (horizontal) line of 1 dot in width and 2 dots in interval with respect to the direction substantially perpendicular to the surface movement direction of the photosensitive drum) was outputted. This half-tone image was visually observed, so that the charging lateral stripe image was evaluated based on the following evaluation criteria.

(Evaluation of Charging Lateral Stripe Image on Half-Tone Image)

Rank A: Even when the half-tone image was observed, no charging lateral stripe image was observed on the half-tone image.

Rank B: The charging lateral stripe image was not observed by the visual observation, but when the half-tone image was observed through a microscope, disorder of the dots was obtained on a part of the half-tone image.

Rank C: The charging lateral stripe image was not observed by the visual observation, but when the half-tone image was observed through the microscope, the disorder of the dots was observed on a whole surface of the half-tone image.

Rank D: The charging lateral stripe image was observed on a part of the half-tone image.

8. Evaluation Result

As described above, when the surface of the photosensitive drum 1 is charged by the charging member 2, a time from contact of a certain point of the surface of the charging member 2 with the cleaning member 8 until the certain point subsequently contacts the cleaning member by the rotation of the charging member 2 is the rotation time A [sec].

Further, the time constant τ of the charging member 2 is defined as a value represented by the following formula:

$$\tau = 1/2\pi fp \text{[sec]},$$

(wherein fp is a frequency at which an absolute value of an imaginary part obtained by impedance measurement of the charging member 2 shows a maximum value).

The time constant τ of the charging member 2 is defined as an index indicating that an electric charge of the surface of the charging member 2 is attenuated.

At this time, on the basis of the evaluation results of the embodiments and the comparison examples, the image forming apparatus 100 has a constitution in which the above-described rotation time A and the above-described time constant τ satisfy the following formula:

$$A/\tau \geq 60,$$

and in which the time constant τ is $1.0\times10^{-5}$ [sec] or more and $1.2\times10^{-3}$ [sec] or less.

Further, it is preferable that the time constant τ of the charging roller 2 is $1.0\times10^{-5}$ [sec] or more and $1.0\times10^{-4}$ [sec] or less.

Incidentally, when both requirement of the above-described A/τ and a requirement of the range of t are satisfied, an upper-limit value of the A/τ is not particularly set, but on the basis of the evaluation results of the embodiments and the comparison examples, it is possible to exemplify that A/τ≤8000, preferably A/τ≤2320 is satisfied.

In the following, description will be made further specifically on the basis of the evaluation results of the embodiments and the comparison examples.

Superiority of Embodiment Over Comparison Examples

Superiority of the embodiment 1 over the comparison examples 1 and 2 will be described.

First, in the comparison example 1, the time constant τ of the charging roller 2 is large, so that A/τ≥60 is not satisfied in the image evaluation 1 and the image evaluation 2. For this reason, a friction interval of the surface of the charging roller 2 generating triboelectric charge between the charging roller 2 and the cleaning roller 8 is earlier than electric charge attenuation of the charging roller 2, so that electric charge accumulation is generated on the charging roller 2. By this, when the continuous image output is performed, the absolute value of the surface potential of the charging roller 2 lowers. As a result, the visually observed charging lateral stripe image was generated on a part of the image in the image evaluation 1 and on whole image in the image evaluation 2.

Further, in the comparison example 2, the time constant τ of the charging roller 2 is smaller than the time constant τ in the comparison example 1, but is larger than the time constant τ in the embodiment 1, so that although A/τ≥60 is satisfied in the image evaluation 1, A/τ is not satisfied in the image evaluation 2 in which a setting such that the print speed is high is made. By this, in the image evaluation 1, the visually observed charging lateral stripe image was not generated, but in the image evaluation 2, the visually observed charging lateral stripe image was generated on a part of the image.

Next, superiority of the embodiment 1 will be described.

In the embodiment 1, the time constant τ is smaller than the time constant τ in the comparison example 1, so that A/τ≥60 is satisfied in the image evaluation 1 and the image evaluation 2. For this reason, for the above-described reason, the lowering in absolute value of the surface potential of the charging roller 2 does not occur, so that a good image was observed in the image evaluation 1. On the other hand, in the image evaluation 2 in which the print speed is high, by the influence that the value of A/τ becomes smaller than the value of A/τ in the image evaluation 1, although the visually observed charging lateral stripe image did not generate, disorder of the image dots was observed in observation through the microscope. This would be considered because a time in which the electric charge attenuation is completed is substantially the same as a time from electric charge accumulation on the charging roller 2 by the friction to subsequent friction of the charging roller 2, and therefore, the charging lateral stripe to the extent that cannot be visually observed generated.

Next, the comparison example 3 and the comparison example 4 in which A/τ≥60 is satisfied but another image defect generates will be described. In the comparison example 3, the time constant of the charging roller 2 is very small, and the electric resistance is also small. In the image evaluation 1, a black stripe in a lateral (horizontal) direction generated on the image. This would be considered because due to the very small time constant, the electric field concentrates at a part of the surface of the charging roller 2 and a current flows through the photosensitive drum 1, and thus improper charging is caused.

Further, in the comparison example 4, by using the charging roller (4) which is the same as the charging roller in the comparison example 2, the peripheral speed of the charging roller 2 was made slower than the peripheral speed of the photosensitive drum 1 so that A/τ≥ is satisfied in the image evaluation 1 and the image evaluation 2. The friction resistance is generated between the charging roller 2 and the photosensitive drum 1 due to the peripheral speed difference, and thus a contact state between the charging roller 2 and the photosensitive drum 1 becomes unstable, so that run-out occurs. By this, it would be considered that in the comparison example 1, a density fluctuation with respect to the lateral direction occurs on the image.

More Effective Other Embodiments

Other embodiments more effective than the embodiment 1 will be described.

In the embodiment 1, compared with the embodiment 1, the time constant of the charging roller 2 is smaller. By this, the value of A/τ is sufficiently larger than 60, and the electric charge attenuation of the charging roller 2 is sufficiently earlier than the electric charge accumulation of the charging roller 2, and therefore, a good image was obtained in the image evaluation 1 and the image evaluation 2.

On the other hand, in the embodiment 2, in the image evaluation 3, the charging lateral stripe image generated on o part of the image. This would be considered due to the following reason. By a long-term printing operation, the toner collected is accumulated in the sponge-shaped cleaning roller 8, and thus the surface of the cleaning roller 8 becomes hard, so that the contact pressure between the cleaning roller 8 and the charging roller 2 becomes high. By this, the influence of the triboelectric charge on the charging roller 2 becomes strong. In such a case, the influence of the charging due to the friction between the cleaning roller 8 and the charging roller 2 appears as improper charging when an associated portion passes through the control portion between the charging roller 2 and the photosensitive drum 1 immediately thereafter. This is because the electric charge attenuation is not in time until the charging roller 2 reaches the contact portion between itself and the photosensitive drum 1 due to a large influence of the triboelectric charge by one friction. By this, it would be considered that in the image evaluation 3, the charging lateral shape image generated on the part of the image.

The embodiment 3 is different from the embodiment 2 in that the cleaning roller 8 is prepared by winding the sponge sheet 85 helically around the rotation shaft 84. By adjusting an interval (pitch) of the helically wound sponge sheet 85, a friction opportunity between the charging roller 2 and the cleaning roller 8 (the surface of the sponge sheet 85) can be reduced. In the embodiment 3, by adjusting a winding manner of the sponge sheet 85 so that the friction opportunity between the charging roller 2 and the cleaning roller 8 becomes ½ of the friction opportunity in the embodiment 2, a result of the image evaluation 3 was better than the result in the embodiment 2 by one rank.

The embodiment 4 is different from the embodiment 3 in that the contact position between the cleaning roller 8 and the charging roller 2 is changed. In the embodiment 4, the contact position between the cleaning roller 8 and the charging roller 2 is changed to a side upstream of the position in the embodiment 3 with respect to the rotational direction of the charging roller 2.

By this, until the surface of the charging roller 2 reaches the contact portion with the photosensitive drum 1 after being subjected to friction from the cleaning roller 8, the electric charge of the charging roller 2 by the friction becomes more liable to attenuate. As a result, in the embodiment 4, a result of the image evaluation 3 was better than the result in the embodiment 3. Incidentally, in the constitution of the embodiment 4, an inclination (angle θ) of the rectilinear line L2 relative to the rectilinear line L1 as 21°, but is not limited thereto. This angle θ can be appropriately set so that a desirable result can be obtained in conformity to the embodiment 4. This angle θ may preferably be made 5° or more and 90° or less, and it is possible to typically exemplify the angle θ of 10° or more and 45° or less.

The embodiment 5 is different from the embodiment 4 in the urging method of the cleaning roller 8 against the charging roller 2. In the embodiment 5, by the charging roller bearing member 52, the cleaning roller bearing member 53 and the cleaning roller pressing spring 63 are supported. Further, by the cleaning roller pressing spring 63, the cleaning roller 8 is pressed and contacted to the charging roller 2. For that reason, even in the case where the surface of the cleaning roller 8 becomes hard by accumulation of the toner collected in the sponge portion of the cleaning roller 8, an increase in contact pressure between the cleaning roller 8 and the charging roller 2 can be suppressed. By this, the influence of the triboelectric charge on the charging roller 2 can be more reduced than the influence in the embodiment 4, so that a result of the image evaluation 3 was better than the result in the embodiment 4 by one rank.

As described above, according to the above-described embodiments, the residual electric charge of the charging roller 2 is attenuated earlier than repetition of the friction of the charging roller 2 with the cleaning roller 8. By this, the charge accumulation of the charging roller 2 is reduced, and occurrence of electric discharge non-uniformity from the charging roller 2 to the photosensitive drum 1 is suppressed, so that occurrence of the image defect due to the improper charging of the photosensitive drum 1 can be suppressed.

Accordingly, according to embodiments, even during the continuous drive for a long time, the charging of the charging roller 2 by the cleaning roller 8 is suppressed, so that it becomes possible that the occurrence of the image defect due to the improper charge of the photosensitive drum 1 by the charging roller 2 is suppressed.

In the above, the present invention was described based on specific embodiments, but the present invention is not limited to the above-described embodiments.

In the above-described embodiments, the case where the cleaning member is the cleaning roller was described as an example, but the present invention is not limited thereto. The cleaning member may be a brush-shaped member, a blade-shaped member, a sheet-shaped member, and the like.

Further, in the above-described embodiments, the image forming apparatus was of the process cartridge type, but the present invention is not limited thereto. The present invention is also applicable to an image forming apparatus having a constitution in which the process means is not readily detachably mountable to the apparatus main assembly, and a similar effect can be obtained.

In the above-described embodiments, the example of the helical roller was cited as the cleaning member including the cleaning portion and the non-cleaning portion, but is not limited thereto. For example, a constitution in which a cleaning member including a rotation shaft and a plurality of cleaning members provided with intervals along an axial direction of the rotation shaft is moved in the axial direction of the rotation shaft may be employed. Also, by this, a constitution in which the cleaning portion and the non-cleaning portion alternately oppose a certain point of the surface of the charging member can be realized. Further, a constitution in which a cleaning member including a plurality of cleaning portions provided radially around the rotation shaft is rotated may be employed.

Further, the present invention is applicable to not only a so-called a monochromatic image forming apparatus including a single image forming portion but also, for example, a color image forming apparatus in which a plurality of image forming portions are provided and in which a toner image is transferred onto a recording material through an intermediary transfer member. In this case, the present invention can be applied to at least one of the plurality of the image forming portions and a similar effect can be obtained.

Further, also in this case, a process means in at least one of the plurality of the image forming portions may be made detachably mountable as a process cartridge to an apparatus main assembly.

According to the present invention, it becomes possible to suppress an occurrence of inconveniences due to triboelectric charge between the charging member and the cleaning member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-077637 filed on May 12, 2024, which is hereby incorporated by reference herein in its entirety.

What is claimed is:

1. An image forming apparatus comprising:

a rotatable photosensitive member;

a charging member configured to electrically charge a surface of the photosensitive member while rotating in a predetermined direction in contact with the surface of the photosensitive member; and a cleaning member configured to clean a surface of the charging member in contact with the charging member, wherein when the surface of the photosensitive member is charged by the charging member, in a case where a time from when a point of the surface of the charging member contacts the cleaning member until the point subsequently contacts the cleaning member again by a rotation of the charging member is defined as a rotation time A [sec], and a time constant $\tau$ of the charging member is a value represented by $\tau=\frac{1}{2}\pi fp$ [sec], wherein fp is a frequency at which an absolute value of an imaginary part obtained by impedance measurement of the charging member shows a maximum value, and the time constant $\tau$ is defined as an index indicating that an electric charge of the surface of the charging member is attenuated, the rotation time A and the time constant $\tau$ satisfy the following relationship:

$$A/\tau \geq 60,$$

wherein the time constant $\tau$ is $1.0\times10^{-5}$ [sec] or more and $1.2\times10^{-3}$ [sec] or less.

2. An image forming apparatus according to claim 1, wherein the time constant $\tau$ is $1.0\times10^{-5}$ [sec] or more and $1.0\times10^{-4}$ [sec] or less.

3. An image forming apparatus according to claim 1, wherein the charging member is constituted so as to be rotated with rotation of the photosensitive member.

4. An image forming apparatus according to claim 1, wherein the cleaning member is rotatable.

5. An image forming apparatus according to claim 4, wherein the cleaning member is a roller including a rotation shaft and an elastic layer formed around the rotation shaft in a cylindrical shape.

6. An image forming apparatus according to claim 4, wherein the cleaning member includes a cleaning portion for cleaning the surface of the charging member in contact with the charging member and a non-cleaning portion smaller in diameter than the cleaning portion and being in non-contact with the surface of the charging member, and wherein the cleaning member is constituted so that the cleaning portion and the non-cleaning portion alternately oppose the point of the surface of the charging member with respect to a rotational axis direction of the charging member.

7. An image forming apparatus according to claim 4, wherein the cleaning member is a roller including a rotation shaft and an elastic layer formed around the rotation shaft in a helical shape.

8. An image forming apparatus according to claim 4, wherein the cleaning member is constituted so as to be rotated with rotation of the charging member.

9. An image forming apparatus according to claim 1, wherein in a cross section substantially perpendicular to a rotational axis of the charging member, when a rectilinear line passing through a rotation center of the photosensitive member and a rotation center of the charging member is a rectilinear line L1, and a rectilinear line passing through a rotation center of the cleaning member and the rotation center of the charging member is a rectilinear line L2, the cleaning member is provided so that the rectilinear line L2 is positioned on a side upstream of the rectilinear line L1 and downstream of a contact position between the charging member and the photosensitive member with respect to a rotational direction of the charging member on the basis of the rotation center of the charging member.

10. An image forming apparatus according to claim 1, further comprising:

a first bearing member configured to rotatably support the cleaning member and being movable;

a second bearing member configured to rotatably support the cleaning member and movably supported by the first bearing member;

a first urging member configured to urge the first bearing member toward the photosensitive member; and a second charging member configured to urge the second bearing member toward the charging member and supported by the first bearing member.

11. An image forming apparatus according to claim 1, further comprising a cartridge including the photosensitive member, the charging member, and the cleaning member, wherein the cartridge is configured to be demountable from the image forming apparatus.

* * * * *